United States Patent [19]
Fajt et al.

[11] Patent Number: 6,096,179
[45] Date of Patent: *Aug. 1, 2000

[54] CARBON-REINFORCED ELECTRODE AND METHOD OF MAKING SAME

[75] Inventors: James R. Fajt, Ames, Iowa; David A. Caple, Beulah; Brian B. Elson, Pueblo, both of Colo.

[73] Assignee: Southeastern Trading, LLP, Monticello, Ark.

[*] Notice: This patent is subject to a terminal disclaimer.

[21] Appl. No.: 09/325,163

[22] Filed: Jun. 3, 1999

Related U.S. Application Data

[63] Continuation-in-part of application No. 08/944,297, Oct. 6, 1997, Pat. No. 5,925,230.

[51] Int. Cl.$^7$ .................................................. C25B 11/12
[52] U.S. Cl. ....................... 204/294; 204/666; 204/672; 204/674; 204/551; 205/760; 502/416; 502/418; 521/64; 521/181
[58] Field of Search .................................... 204/666, 672, 204/674, 551, 294; 205/760; 502/418, 416; 521/181, 64

[56] References Cited

U.S. PATENT DOCUMENTS

| | | | |
|---|---|---|---|
| 4,873,218 | 10/1989 | Pekala | 502/418 |
| 4,997,804 | 3/1991 | Pekala | 502/418 |
| 5,192,432 | 3/1993 | Andelman | 210/198 |
| 5,196,115 | 3/1993 | Andelman | 210/198 |
| 5,200,068 | 4/1993 | Andelman | 210/198 |
| 5,360,540 | 11/1994 | Andelman | 210/198 |
| 5,402,306 | 3/1995 | Mayer et al. | 361/502 |
| 5,415,768 | 5/1995 | Andelman | 210/198 |
| 5,425,858 | 6/1995 | Farmer | 204/149 |
| 5,529,971 | 6/1996 | Kaschmitter et al. | 502/416 |
| 5,538,611 | 7/1996 | Otowa | 204/551 |
| 5,547,581 | 8/1996 | Andelman | 210/656 |
| 5,925,230 | 7/1999 | Fajt et al. | 204/666 |
| 5,977,015 | 11/1999 | Fajt et al. | 502/418 |

OTHER PUBLICATIONS

The Use of Capacitive Deionization With Carbon Aerogel electrodes to Remove Inorganic Contaminants From Water, J.C. Farmer, et al., Paper prepared for submittal to the Low Level Waste Conference, Orlando, FL, Jul. 10–12, 1995, dated Feb. 17, 1995.

Capacitive Deionization of NaCl and NaNO$_3$ solutions With Carbon Aerogel electrodes, By Joseph C. Farmer, et al. for Lawrence Livermore national laboratory, no month/yr. available.

Capacitive Deionization System, J. H. Richardson, et al., Paper prepared for submittal to Technology 2006—The Seventh National Technology Transfer Conference and Exposition, Anaheim, CA, Oct. 29–31, 1996, dated Oct. 1996.

Desalination with Carbon Aerogel Electrodes, Joseph C. Farmer, et al., UCRL–ID–125298, dated Oct. 21, 1996.

Desalination with Carbon Aerogel Electrodes, Joseph C. Farmer, et al., UCRL–ID–125298 Rev 1, dated Dec. 4,1996.

Electrosorption on Carbon Aerogel Electrodes as a Means of Treating Low–Level Radioactive Wastes and Remediating Contaminated Ground Water, Tri Duc Tran, et al., Paper prepared for submittal to Sixth International Conference on Radioactive Waste Management and Environmental Remediation, Singapore, Singapore, Oct. 12–16, 1997, dated Jul. 17, 1997.

The Application of Carbon Aerogel Electrodes to Desalination & Waste Treatment, Joseph C. Farmer, et al., Paper prepared for submittal to Annual Meeting of the American Institute of Chemical Engineers, Los Angeles, CA, Nov. 16–21, 1997, dated Aug. 1, 1997.

Modeling the Corrosion of High–Level Waste Containers: CAM–CRM Interface, Joseph Farmer, et al., Paper prepared for submittal to SPECTRUM '98, American Nuclear Society, Denver, CO, Sep. 13–18, 1998, dated Dec. 9, 1997.

Development of Integrated Mechanistically–Based Degradation–Mode Models for Performance Assessment of High–Level Waste Containers, Joseph Farmer, et al., UCRL–ID–130811, dated Jun. 1998.

*Primary Examiner*—Bruce F. Bell
*Attorney, Agent, or Firm*—Pennie & Edmonds LLP

[57] ABSTRACT

A carbon-reinforced electrode is disclosed. The electrode is formed from a high surface area absorptive material ("HSAAM electrode") made from resorcinol, formaldehyde, a carbon reinforcing agent, a catalyst, and reaction products thereof, and is in a carbonized form. This electrode removes ions from a liquid when an electric current is applied. The liquid may be passed through a thickness of the electrode, or may be passed by the surface of the electrode. A method of making the HSAAM electrodes is also disclosed. The HSAAM electrodes are formed from setting a polymerized mixture of resorcinol, formaldehyde and a carbon reinforcing agent supplied in the form of carbon fibers, carbon felt or cellulose under controlled temperature and time constraints, and subsequently firing the resulting product so as to carbonize the electrode.

26 Claims, 16 Drawing Sheets

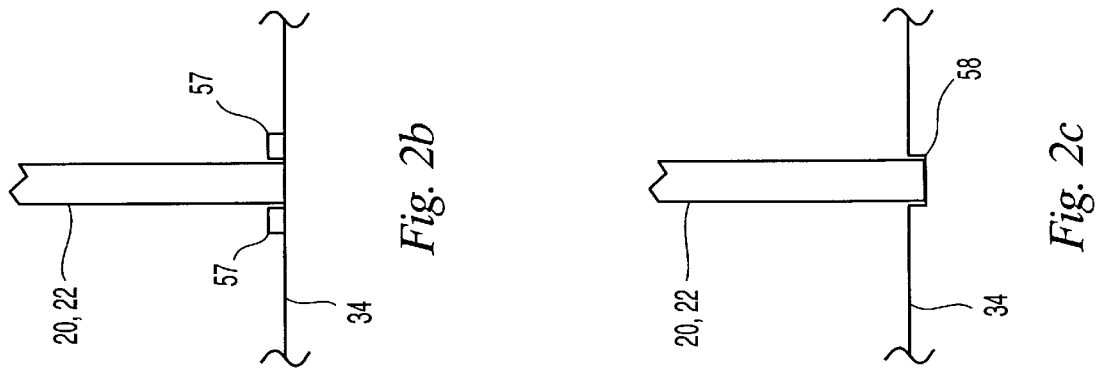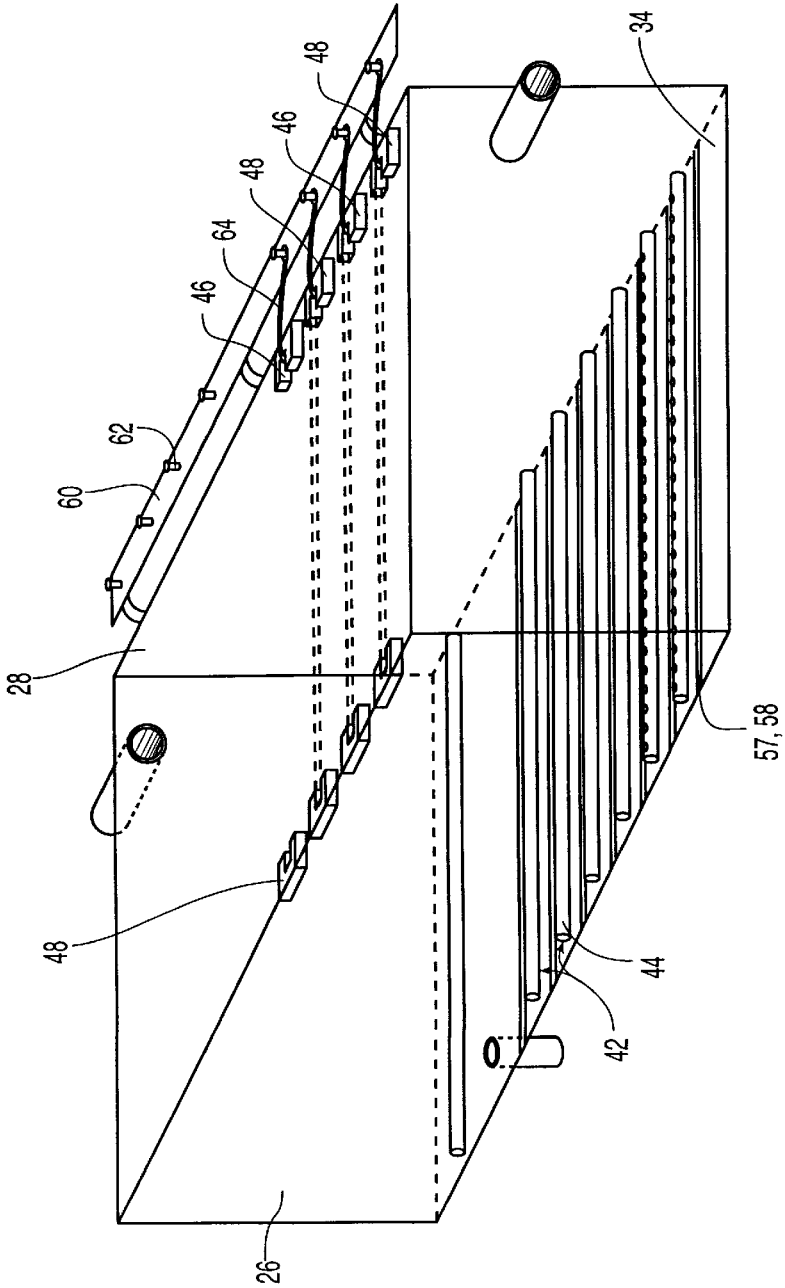

Iron concentration vs. time for batch processed sample.

Copper concentration vs. time for batch processed sample.

Magnesium concentration vs. time for batch processed sample.

CARBON-REINFORCED ELECTRODE AND METHOD OF MAKING SAME

RELATED APPLICATIONS

This is a continuation-in-part of application Ser. No. 08/944,297, filed Oct. 6, 1997, now U.S. Pat. No. 5,925,230.

BACKGROUND OF THE INVENTION

The present invention relates to carbon aerogels, electrochemical cells and systems for deionization and purification of water effluents.

Resorcinol is a well-known material commonly used in resins, dyes, adhesives, pharmaceuticals, and other applications. It can be obtained in a variety of grades and forms, such as crystals, flakes, pellets, and the like. Resorcinol, in its various forms, is soluble in water, alcohol, ether, benzene, glycerol and formaldehyde.

As disclosed in U.S. Pat. No. 5,425,858 to Farmer, resorcinol can be used to synthesize carbon aerogels. Specifically, carbon aerogel can be produced by the polycondensation of resorcinol and formaldehyde in a slightly basic medium, followed by supercritical drying and pyrolysis in an inert atmosphere. Thin electrodes formed from such carbon aerogels may be used in capacitive deionization applications, as disclosed in this reference, whose contents are incorporated by reference in their entirety.

The thin electrode plates (approximately 0.25 mm thickness) formed by this process, however, have a number of drawbacks. First, they are prohibitively expensive to use on a commercial scale, costing on the order of $1000/square inch of surface area. Second, a device using these electrodes has only been effectively driven at voltages and currents lower than those at which water is electrolyzed. Also, the thin nature of the plates limits the deionization capacity. The thin plates are not self supporting and it is difficult to make a direct reliable electrical connection with these. Finally, these electrodes are glued to a titanium plate and so one side of each of these plates is unavailable for use as a deionization surface.

SUMMARY OF THE INVENTION

The present invention is directed to a deionization apparatus comprising a tank having a plurality of deionization cells. Each deionization cell comprises three non-sacrificial electrodes of two different types. One electrode comprises a high surface area absorptive material ("HSAAM electrode") formed as a plate having two sides facing in opposite directions. The HSAAM electrode removes ions from the liquid being deionized. This HSAAM electrode is bordered by two electrodes, one on either side, which do not remove ions from the liquid being deionized.

The bottom of the tank may be provided with a network of pipes for conducting air, each pipe being provided with small holes through which air may escape. Air pumped through these pipes agitates and mixes the liquid being deionized, thus promoting the contact and capture of ions on the HSAAM electrodes.

The non-HSAAM electrodes in the present invention are present in the form of carbon cloth (CC) or graphite plate electrodes affixed to either side of a flat, nonconductive structural support member. The non-HSAAM electrode on one side of the structural support member is electrically isolated from the non-HSAAM electrode on the other side of the structural support member. Thus, each non-HSAAM electrode is associated with a different HSAAM electrode. This results in a deionization cell comprising first and second non-HSAAM electrodes, each mounted on a different structural support member, but facing the same HSAAM electrode sandwiched therebetween.

The HSAAM electrodes used in the deionization cells are produced by first dissolving resorcinol in formaldehyde to form an initial liquor. A catalyst is added to promote polymerization and to effect the final structure of the HSAAM. A predetermined amount of a non-sacrificial material is introduced to the liquor as a reinforcing material. Sufficient heat is added by heating the mixture at a sufficient temperature or for a sufficient time such that a controlled polymerization takes place and the mixture reaches a consistency sufficient to support the reinforcing material. The resulting viscous liquid is then allowed to continue polymerization to form a solid in a mold. The resulting brick is then fired in an oven until it is carbonized, after which it is machined for subsequent use in the apparatus.

BRIEF DESCRIPTION OF THE DRAWINGS

These and other features, aspects, and advantages of the present invention can be seen in the drawings in which:

FIG. 2A is a view of the tank used in the apparatus of the present invention.

FIGS. 2B and 2C show two arrangements for immobilizing the HSAAM plates within the tank.

DESCRIPTION OF THE PREFERRED EMBODIMENT

Figure 1:
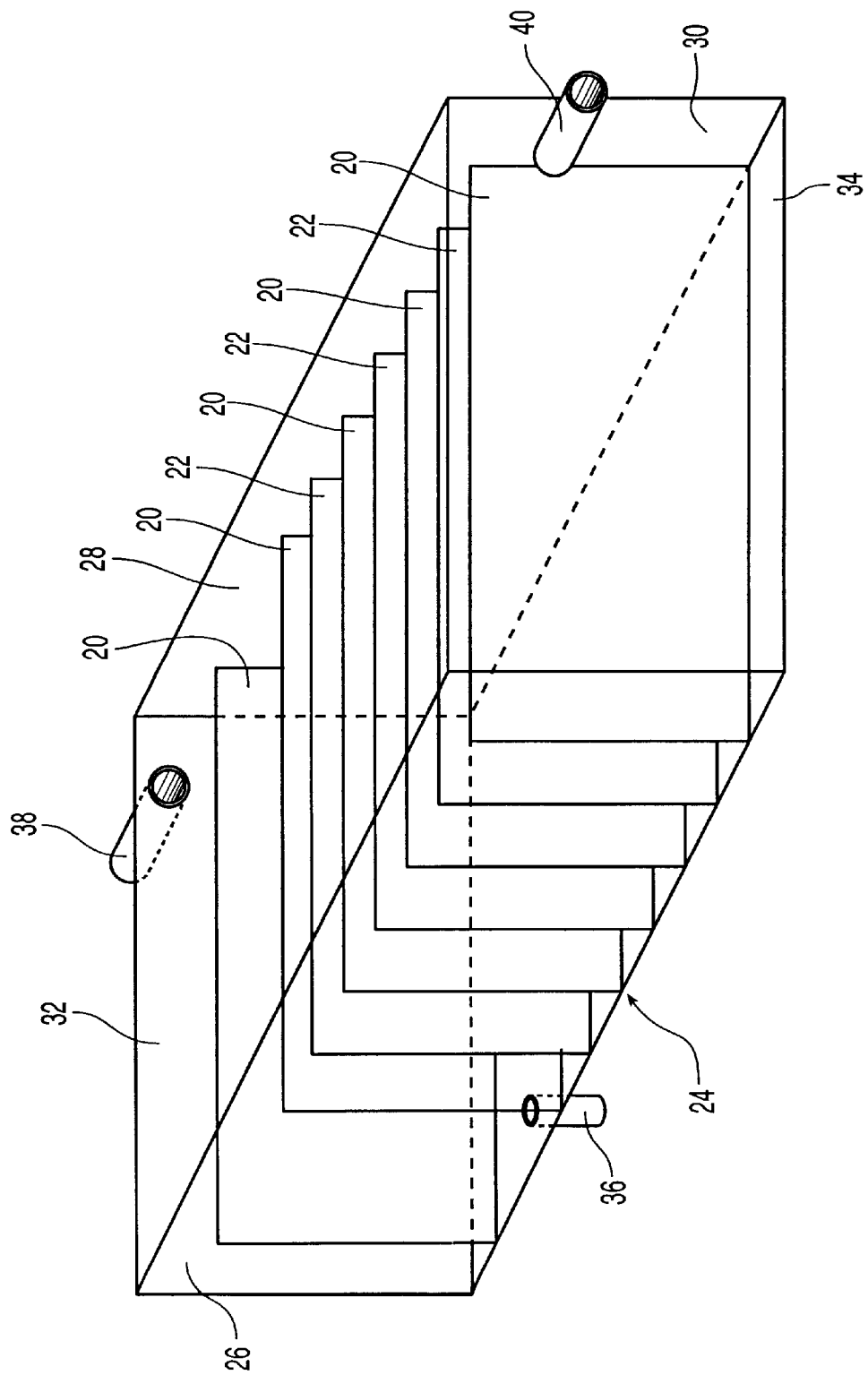
FIG. 1 is a perspective view of an apparatus formed in accordance with the present invention.

FIG. 1 shows an apparatus 18 made in accordance with the present invention. The apparatus comprises a number of parallely arranged, upstanding electrodes 20, 22. As discussed below, two different types of electrodes are provided, and these alternate.

The electrodes of the apparatus are mounted widthwise in a substantially rectangular chamber or tank 24. The tank itself comprises a pair of side walls 26, 28, a pair of end walls 30, 32, and a flat bottom 34. The tank walls are preferably formed from glass, plastic, plexiglass, or other electrically insulative, water-tight material.

Figure 3:
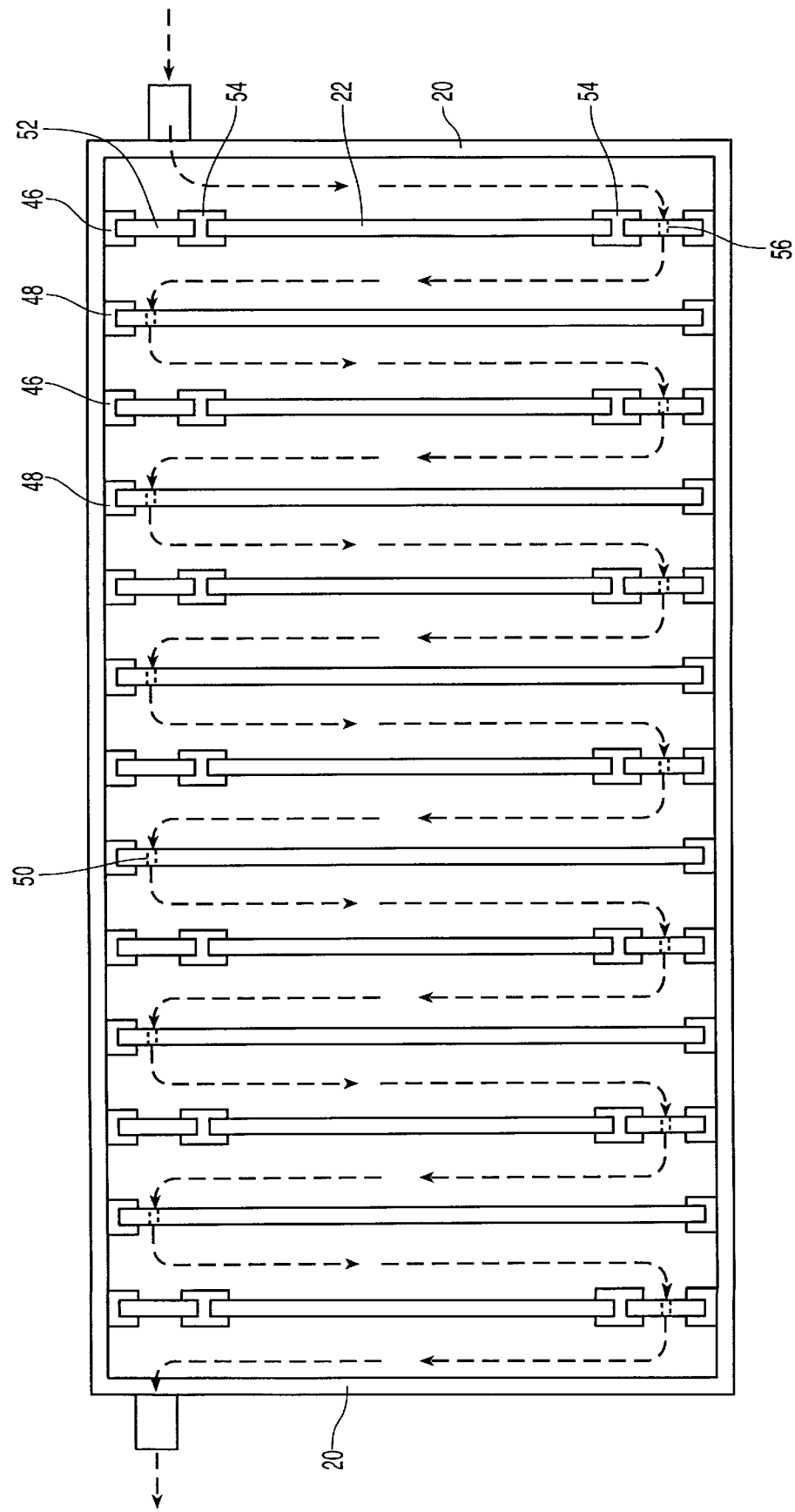
FIG. 3 is a top view of the apparatus of FIG. 1 arranged for serpentine flow.

An inlet 36 formed in the bottom and an outlet 38 in a first end wall provide for the entry and exit of a liquid that is deionized while in the tank. Alternatively, the inlet may be formed in the second end wall when serpentine flow, as depicted by the dashed path in FIG. 3, is desired. Also, multiple inlets and outlets, spaced apart from one another in the bottom, or sides, may be provided when a single tank is employed to deionize liquids from different sources, each liquid having ions of different polarities and sizes to be removed.

At the base of the tank is an air diffuser 42 through which air is introduced. As shown in FIG. 2A, the air diffuser comprises a number of parallely arranged pipes 44 formed from styrene or the like and have small openings formed therein. The pipes 44 extend across the width of the tank, and, in the preferred embodiment, are placed between facing electrodes. When the apparatus is operational, air is pumped through these pipes to aerate and agitate the liquid in the tank. This promotes deionization by mixing the liquid within the tank and agitating the ions between oppositely charged electrodes.

It should be evident to one skilled in the art that equivalent aeration means may be used in place of the network of parallel tubes provided with openings. For example, a false bottom may be provided and air, pumped between the tank bottom and false bottom, would percolate through openings formed in the latter. Another alternative is to place a substantially flat plastic bladder on the tank bottom and air, once pumped into the bladder, could enter the liquid through openings in a top side thereof.

The side walls 26, 28 of the tank are provided with a row of mounting clips, also molded from styrene or other plastic, on their inward facing surfaces. The mounting clips 46, 48, as shown on FIG. 2a, serve to align and retain electrodes inserted into the tank. Mounting clips 46 and 48 may differ in size, shape and materials, depending on the physical and chemical properties of the electrodes 20, 22, which they are designed to accommodate.

An electrode may be inserted, at each side edge thereof, directly into opposing mounting clips. In such case, the electrode may be formed with an opening 50, as shown in FIG. 3, adjacent to where it is inserted into the mounting clip. This opening 50 serves as a passage through which liquid may pass as it courses through the tank.

Alternatively, an electrode may be indirectly held by a mounting clip via an acrylic spacer 52 on one or both of its ends, the acrylic spacer being fixed to the electrode by means of a connecting clip 54. In such case, an opening 56 may be formed in the acrylic spacer itself to allow liquid to pass therethrough. This arrangement is especially advantageous when the opening cannot be formed in the electrode itself, for structural, electrical, or other reasons.

In addition, the bottom 34 of the tank can be provided with plastic guard members 57, as seen in FIG. 2B, or grooves 58, as seen in FIG. 2C which extend widthwise across the tank. Such guard members and grooves allow one to selectively, slideably adjust electrodes towards one side wall or the other. This is especially advantageous when it is desired to have serpentine flow of the liquid past each face of each electrode, from the inlet at one end wall of the tank to the outlet formed at the opposite end wall. As an alternative to a guard member or a groove along which an electrode may slide, a central portion of the bottom wall may be provided with slots into which upstanding bottom clips or spring-loaded retainers are inserted. The bottom edge of an electrode may then be inserted into these bottom clips or retainers at any desired distance from either side wall. As described above, acrylic spacer bars may be used to bridge the gap between the free edge of the electrode and the mounting clip.

A busbar 60 may be provided on the exterior side walls of the tank. Each busbar is provided with a plurality of terminals 62 electrically isolated from one another, each one arranged to be connected to an associated electrode. This allows one to individually control the voltage, and the current, applied to each electrode. The individual terminals can be electrically connected to their associated electrodes with conventional electrical leads such as alligator clips or equivalent connecting means. More preferably, however, the individual terminals may be connected, by means of a copper wire 64 connected via a non-sacrificial graphite rod to either the corresponding mounting clips or, when used, the corresponding connecting clip. The electrode then contacts the graphite rod when the electrode is inserted into the mounting or connecting clip. To facilitate this electrical contact, a leaf spring, or the like, may be affixed to the end of the conductive strip, in a known manner. The leaf spring can then be secured to the channel of the clip in which the electrode's edge is inserted.

As stated above, two types of conductive, non-sacrificial electrodes are used in an apparatus formed in accordance with the present invention. In the preferred embodiment, a first type of electrode, formed as a flat plate is bordered on either of its sides by a second type of electrode. Together, the three electrodes form a deionization cell. During operation, a substantially similar voltage potential is normally established between an electrode of the first type and each of the electrodes of the second type. This is accomplished by connecting one lead of a voltage source to the electrode of the first type and a pair of common leads from that same voltage source to each of the two electrodes of the second type. The common leads ensure that a substantially similar potential is maintained between the electrode of the first type and each of the electrodes of the second type bordering the electrode of the first type.

The first type of electrode (22) is formed from a carbon based high surface area absorptive material ("HSAAM electrode"). This electrode removes and retains ions from an aqueous solution when an electrical current is applied. In the preferred embodiment, the HSAAM electrode is formed from resorcinol, formaldehyde, at least one of carbon fiber, carbon felt and cellulose, a catalyst, and reaction products thereof, in a carbonized form. The process for forming an HSAAM electrode is described further below.

The second type of electrode (20), though formed from a conductive material, does not remove or retain ions when an electric current is applied and so is non-absorptive ("non-HSAAM electrode"). This property is common to electrodes formed from carbon cloth, graphite, gold, platinum, and other conductive materials which do not degrade in an electric field in an aqueous solution. In the preferred embodiment, the non-HSAAM carbon electrode is formed from either graphite, or more preferably from carbon cloth, such as part no. PANEX 30 woven fibers available from Zoltek.

Figure 4B:
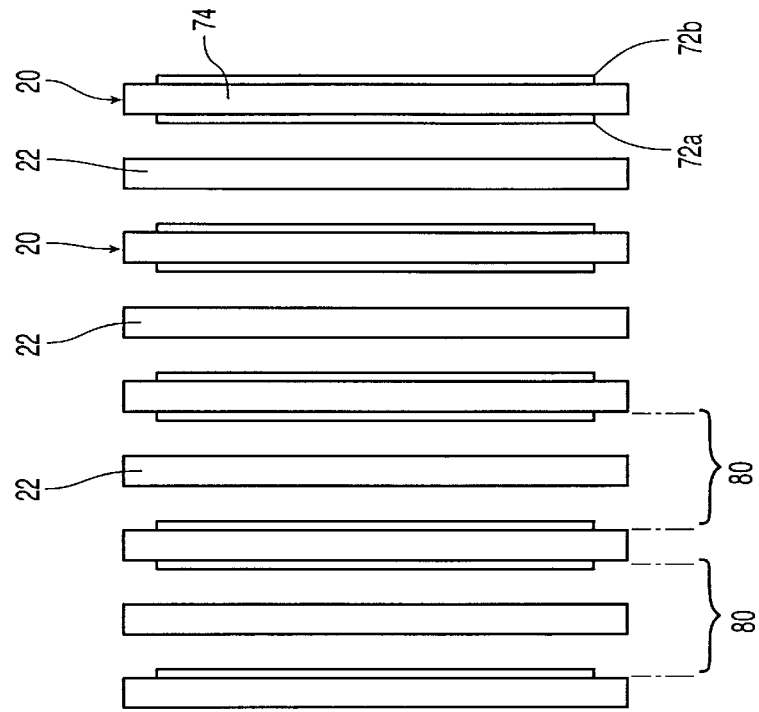
FIG. 4a and 4b show a deionization cell formed from neighboring electrodes.
Figure 4A:
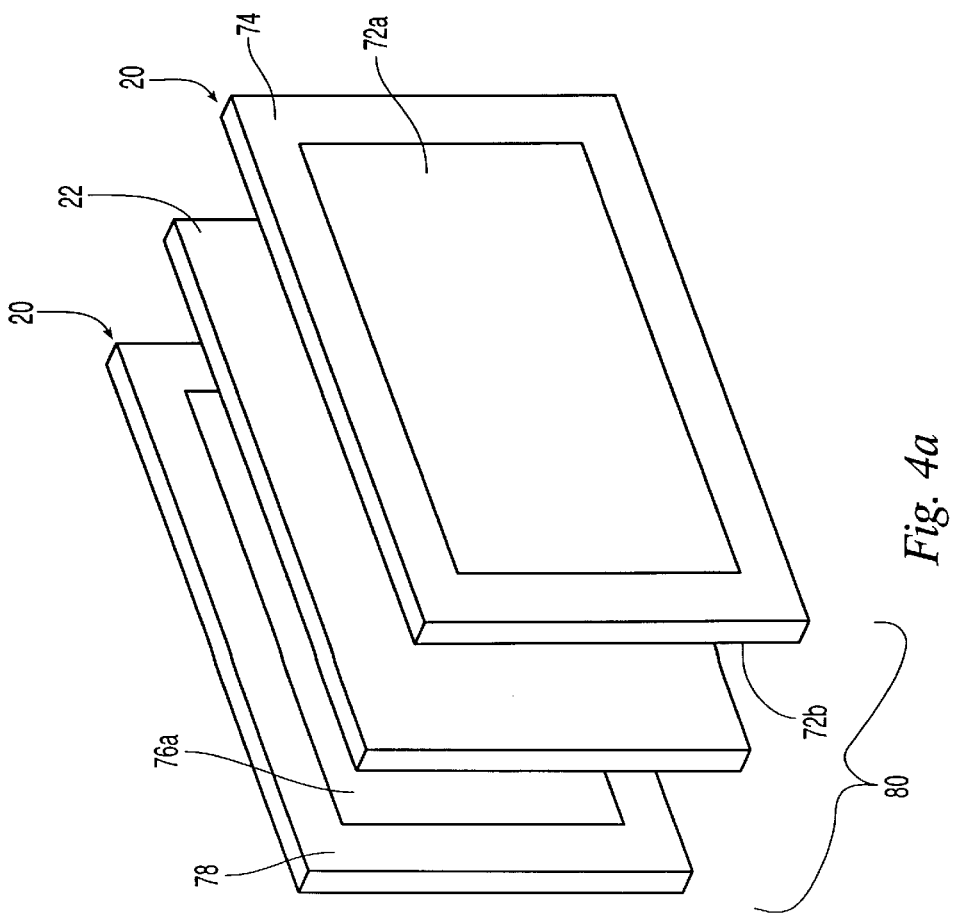

As shown in FIG. 4a, the non-HSAAM carbon electrode 20 is formed as a dual electrode in that it has a pair of conductive surfaces which are electrically isolated from one another. The dual electrode 20 is formed by fixing a separate piece of carbon cloth 72a, 72b to either side of a 3/8" thick sheet of plexiglass 74. The plexiglass serves as a nonconductive, structurally rigid support member, and also prevents the flow of liquid directly through both pieces of carbon cloth. Thus, glass, acrylics, and the like may be used in place of plexiglass. In the preferred embodiment, the carbon cloth is secured to either side of the plexiglass sheet by means of an epoxy adhesive. As is known to those skilled in the art, other adhesives, and even mechanical securing means such as screws, clips, and the like may be used to secure the carbon cloth (CC) electrode.

Once secured to either side of the plexiglass sheet 74, the carbon cloth 72a on one side may, if desired, be electrically connected to its counterpart 72b on the other side of the same sheet 74. Usually, however, this is not the case, so that one may apply different voltages to the carbon cloth on each side of the plexiglass, by means of separate voltage sources. In such case, adjacent cells within a single tank may be driven by different voltage sources.

As shown in FIG. 4b, in an apparatus of the present invention, these two-sided non-HSAAM electrodes 20 are alternated in the tank with the HSAAM electrodes 22, to each of which only a single voltage may be applied at any given time. Thus, in an apparatus of the present invention, one side of an HSAAM electrode faces a CC electrode 72b affixed to a first sheet 74 of plexiglass, while the second, reverse side of the HSAAM electrode, faces a CC electrode 76a affixed to a second sheet 78 of plexiglass. In this manner, each of the HSAAM electrodes 22 with its pair of corresponding non-HSAAM cloth electrodes form a deionization cell 80. End walls 30, 32 have a carbon cloth electrode affixed on their inwardly facing sides, which electrode becomes part of a cell.

In use, two CC electrodes 72b, 76a which face the same HSAAM electrode 22 are usually maintained at the same polarity and voltage level. Alternatively, if desired, they can be maintained at different levels, as each is provided with its own terminal 62 on the busbar 60. When voltage is applied between the HSAAM electrode 22, and its corresponding non-HSAAM electrodes 72b, 76a, the cell 80 is activated and deionization takes place on both sides of the HSAAM electrode 22. Preferably, the same voltage level is applied to both non-HSAAM electrodes of a single cell. If, however, the two non-HSAAM electrodes on either side of an HSAAM electrode have different surface areas and so can sustain different current densities, it may be possible to drive them at different voltages.

An HSAAM electrode can be positively or negatively charged with respect to the non-HSAAM electrode. When the HSAAM electrode is charged positively, it attracts, absorbs and holds negative ions. This causes the pH of the water in the immediately vicinity of the cell to increase, or become more caustic. When the HSAAM electrode is negatively charged, it attracts, absorbs and holds positive ion, thus lowering the pH of the water, and making it more acidic.

As each HSAAM electrode 22 is bordered on either side by its own pair of CC electrodes, adjacent deionization cells within the same tank can be used to remove different types of ions. Thus, if a pair of spaced apart inlets or outlets are provided on the bottom or sides of the same tank, the deionization cells proximate to these inlets may be activated such that a first set of cells removes ions of a first type, and a second set of cells removes ions of a second type. Similarly, when serpentine fluid flow is desired, the first, upstream set of cells encountered by the fluid may be activated to remove ions of a first type, while a second, downstream set is activated to remove ions of a second type.

In a given tank, a plurality of cells are typically present. In order to completely deionize the water in the tank, both negatively and positively charged HSAAM electrodes should be present. In general, different voltages should be applied to positive and to negative cells to effect ion removal, and the number of positively and negatively charged cells may not be the same. This allows positively and negatively charged HSAAM electrodes to be activated independently and at different voltage levels. Varying the plate spacing and applied voltage, may enable the removal of specific ions from the fluid being treated.

Figure 5:
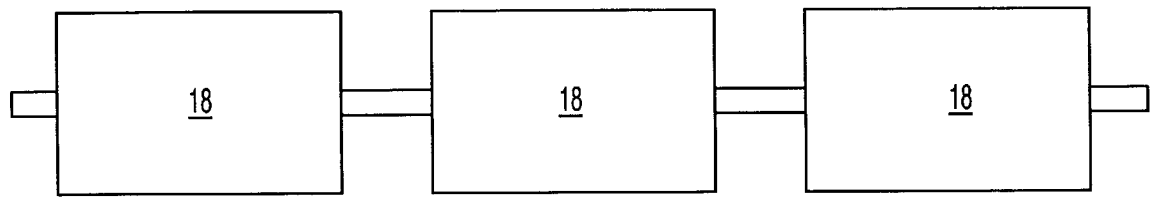
FIG. 5 shows an apparatus with three serially connected devices.

As shown in FIG. 5, multiple tanks may be chained together, the outlet of one being connected to the inlet of the next. In such case, the deionization cells in each tank may be activated in a common manner so that each tank focuses on the removal of one type of ion. Alternatively, successive tanks may be used to remove ever decreasing amounts of the same ion.

Figure 6A:
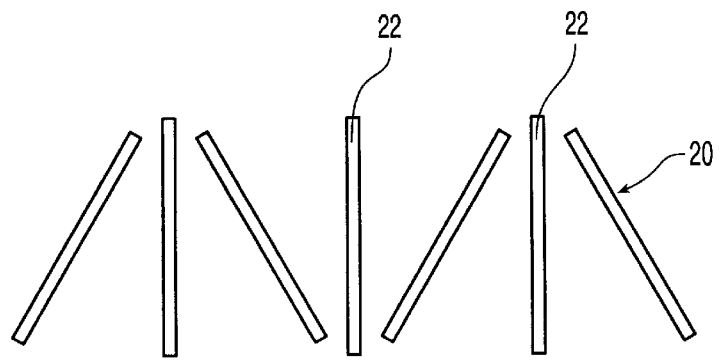
FIGS. 6A and 6B show alternatives to having all the electrodes parallel to one another.
Figure 6B:
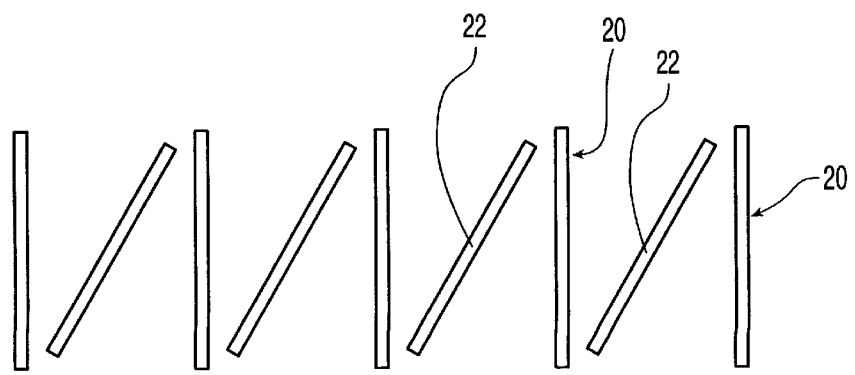

As shown in FIGS. 6A and 6B, it is possible to have electrodes of one type angled slightly with respect to the electrodes of the other type. In FIG. 6A, the HSAAM electrodes are shown to be both parallel to one another and upright. In contrast, the non-HSAAM carbon cloth electrodes on either side of an HSAAM electrode are angled symmetrically about the HSAAM electrode. In such case, adjacent HSAAM electrodes have their respective carbon cloth electrodes angled in a different manner. Similarly, as shown in FIG. 6B, one may have the carbon cloth electrodes standing upright, while the HSAAM electrodes are angled with respect to the carbon cloth electrodes. In the configuration of FIG. 6B, the HSAAM electrodes are still parallel to one another, but are angled with respect to, say, the base and walls of the tank.

Figure 7:
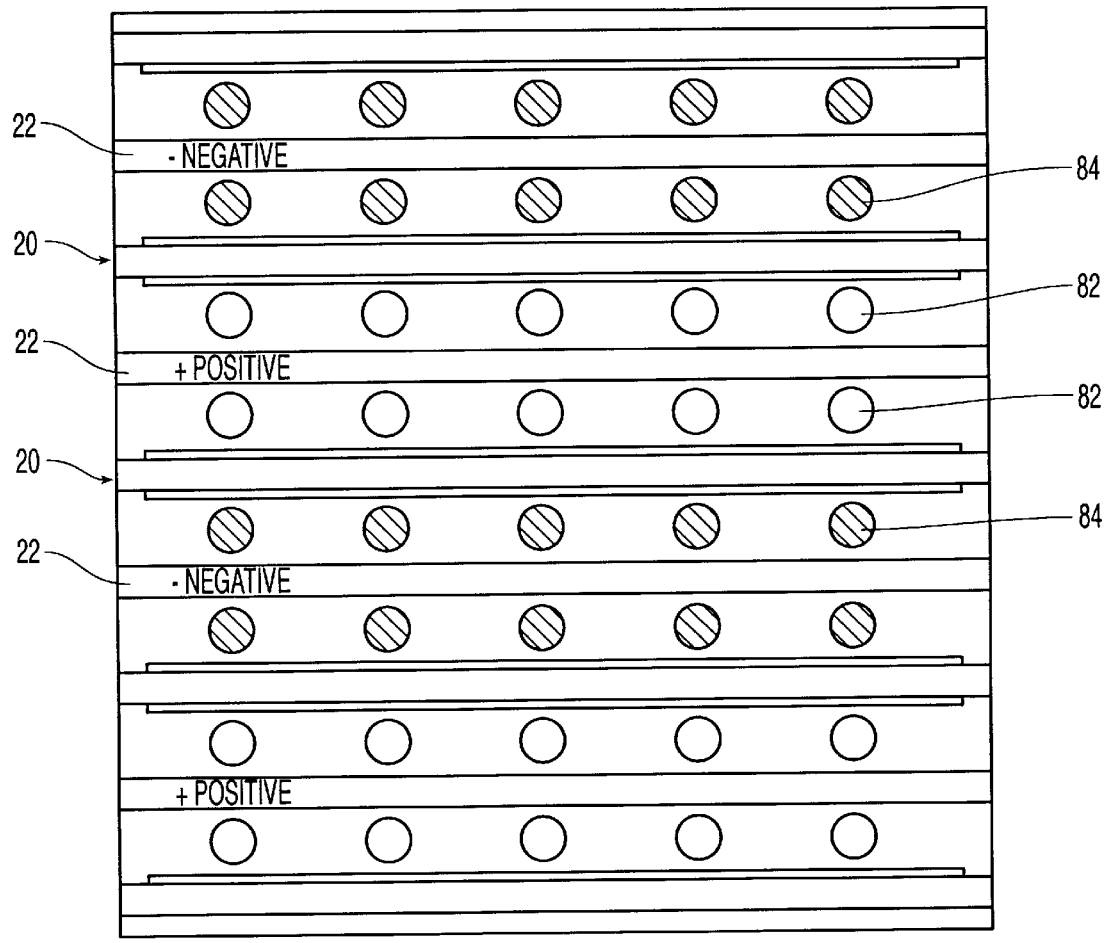
FIG. 7 presents a top view of a tank having ion exit holes formed therein.

FIG. 7 shows a top view of a tank comprising four deionization cells. A first pair of deionization cells having positively charged HSAAM plates are interleaved with a second pair having negatively charged HSAAM plates. The base of the tank, in the region underlying each deionization cell, is provided with an array of holes. For the positively charged deionization cells, these are shown as holes 82, and for the negatively charged deionization cells, these are shown as holes 84.

The purpose of holes 82, 84 is to allow for the selective removal of positive and negative ions collected on the HSAAM plates when the tank is operational. Thus, in those cells having positively charged HSAAM plates, negative ions will collect on the plates. When the cell is regenerated, these ions may be collected through the holes 82. Similarly, during regeneration, the ions collected on the negatively charged HSAAM plates, may be collected through holes 84. As shown in FIG. 7, holes 82 and 84 have approximately the same size and arrangement. This, however, is not a necessity. For instance, the holes for the negatively charged ions may be smaller than those for the positively charged ions. Also, instead of an array of holes arranged parallel to the HSAAM and non-HSAAM electrodes, the holes may appear in more irregular patterns, such as a checkerboard or a honeycomb.

As stated above, the HSAAM electrode is formed from a high surface area absorptive material. In the present invention, this material is formed by an inventive process which requires at least three ingredients: resorcinol, formaldehyde and a reinforcer, such as a carbon source. A catalyst may also be used to facilitate polymerization of the resorcinol-formaldehyde resin.

Resorcinol comes in many different grades, and can be obtained from a number of suppliers in pellets, flakes, and other convenient forms. In the examples given below, resorcinol in the form suitable for organic chemical formulations, from the Hoechst Celanese Company, was used.

Formaldehyde is available from a variety of suppliers, and also comes in different grades and forms. In the examples given below, formaldehyde in form of formalin, which is suitable for dyes, resins and biological preservation, from the Georgia-Pacific Resin, Spectrum Chemical Company was used.

The carbon source used as reinforcement in the formation of the HSAAM electrodes can come in different forms. However, it is important that the carbon fibers be electrically conductive. In general, a predetermined quantity of any relatively pure, conductive carbon source can be used so long as it can either be fully dispersed in a resorcinol-formaldehyde liquor which then sets, or can absorb a similar quantity of the liquor in a matrix, and then set.

Experimentation has shown that pitch based carbon fibers are suitable for use, while PAN (polyacrylonitrile)based fibers are less preferred. Thus, loose carbon fibers, such as THORNEL® P25 4K ¼" cut carbon fiber fibers, available from Amoco, have been successfully used to form HSAAM electrodes for use in the present invention.

One alternative which has also successfully been used is carbon felt, either graphite felt grade wdf 3331060 or carbon felt VDG 3330500, both available from the National Electric Carbon Company.

Another alternative is cellulose fiber, such as in the form available from Cellulo Co. of Fresno, Calif. Suitable cellulose fibers include Carbac Grade 1640BC—carbon impregnated an Cellupore grade 18755D. The cellulose fiber may even be impregnated with activated carbon.

With respect to the second type of electrode, it is important that a non-sacrificial electrical conductor be formed. As stated above, the electrode is preferably formed from carbon cloth or carbon felt. However, other materials such as graphite, gold, platinum, conductive plastics, glassy carbons such as SIGRADUR, available from SGL Carbon Group of St. Mays, Pa., and the like, may be used in place of the carbon cloth or carbon felt.

The process of forming the HSAAM electrodes begins with forming a resorcinol-formaldehyde liquor with approximately a 1-to-2 molar ratio of the former to the latter. For instance, a batch of 4 lbs. of resorcinol solid is added to 3.5 liters of formaldehyde at room temperature, resulting in a combination having approximately a 1-to-2 molar ratio. The quantities stated, of course, may be scaled linearly, either upwards or downwards, to make different total quantities of this initial mix.

Resorcinol dissolves relatively slowly in formaldehyde at a 1-to-2 molar ratio. Therefore, it may take up to 72 hours at a room temperature of between 72–78° F. for the resorcinol to dissolve in the formaldehyde without assistance. Alternatively, this process may be aided by mixing or stirring the combination. As is known to those skilled in the art, when it comes to dissolving one material in another, one may trade time for temperature, and so it should be kept in mind that a range of times and temperatures may be used to dissolve the resorcinol in the formaldehyde.

When the resorcinol completely dissolves, the resulting mixture has an amber to pink color. If this mixture is maintained at or below room temperature for about 12 to 24 hours after dissolution of the resorcinol, this color then turns into a milky and opalescent liquor.

In a first embodiment for producing an HSAAM electrode, 800 mls of this liquor are poured into a stainless steel container. It should be noted here that, although only 800 mls of liquor are used in this example, the process is scalable. Thus, several liters, or even more, may be batch processed at the same time.

For 800 ml of liquor, about 3 ounces by weight of pitch based carbon fibers are added, although experimentation has shown that using between 2–5 ounces of carbon fibers also produces electrodes with adequate properties to the 800 ml of liquor. Preferably, pitch based ¼" carbon fibers are used, although carbon fibers having a cut length varying from ¼" to 1" can also be used to produce electrodes with adequate properties.

The liquor with the added carbon fibers is then liquified in a blender or other suitable container which chops the carbon fibers in various lengths ranging from approximately the diameter of the fiber up to the fibers' original length, depending on the length of time in the blender. Preferably, however, the average fiber length is between 500 $\mu$m and 5 mm in length and more preferably less than 2 mm in length. If carbon fibers already having such a reduced length are available, these can be used without having to be chopped, although blending would still be desirable to help uniformly distribute the carbon fibers in the liquor to form a broth.

In the preferred embodiment, the liquor with the carbon fibers is blended for between 45 seconds up to 2 or 3 minutes using a commercial grade restaurant-type blender having at least a 1 liter capacity and speeds of between 1800 rpm and 3600 rpm. The type of blender, however, is not critical and also other mixing/chopping means may be used. The outcome of this blending is a viscous, black broth which includes the resorcinol/formaldehyde liquor mixed with the sodium carbonate, and carbon fibers combined therewith. The temperature of the broth after the blending step is about 90° F.

During the final stages of blending, or soon thereafter, three ml(milliliters) of a 1.0 molar aqueous solution of sodium carbonate is added as a catalyst, thus giving a catalyst concentration of approximately 0.375%. Experimentation has shown that 3 ml of the catalyst with 80 ml of the liquor provides a controlled polymerization rate which helps mitigate the potential problem of thermal runaway. However, adequate electrodes can also be made using between 1–5 ml of the 1.0 molar sodium carbonate catalyst to give a catalyst concentration of between 0.125%–0.625%. In addition, the catalyst may be added to the liquor before adding the carbon fibers, rather than after. This, however is less preferred since there is little reason to begin polymerization before the carbon fibers are added.

The liquified broth is then allowed to polymerize. To promote polymerization, initially, the broth is poured into a heating vessel, such as a metal pan or other container formed from stainless steel, aluminum or other material having good heat transfer properties. The heating vessel is placed on a variable-temperature electric table heater or exposed to some other heat source and the broth is gradually heated to 130° F. over several minutes, the exact time depending on the temperature of the heat source. While it is heating, the broth is stirred for time to time to ensure that the carbon fibers do not settle and are evenly dispersed throughout.

Once the broth reaches a temperature of 130° F., it is removed from the heat source and placed on a low heat transfer surface, such as wood, and stirring is continued. Polymerization of resorcinol with formaldehyde is an exothermic process, and so heat is generated and the broth's temperature rises even though no heat source is being provided. The temperature of the broth is controlled between 130–150° F. so that the polymerization reaction proceeds properly. If the temperature exceeds about 160° F., the broth is cooled. Cooling can be effected by a number of means such as thermoelectric cells, coils having coolant circulating therethrough, and even water baths, preferably maintained at a temperature between 50–80 F. In the latter case, The vessel may be lowered into a water bath so that 80–90% of the sides of the vessel are surrounded by the water. If the temperature of the broth drops below 120° F., the vessel may be exposed once again to the heat source to have its temperature raised. Thus, one can alternate between exposing the vessel to a heat source, placing the vessel on a low heat transfer surface, and cooling the vessel to maintain the broth's temperature in a desired range. Instead of manual attention, however, automatic temperature regulation may also be performed using conventional monitoring and control devices.

Aside from the temperature, the consistency of the broth is also monitored during the heating process. This ensures that the carbon fibers do not clump together or settle, resulting in unevenly dispersed agglomerations of matted carbon fiber. If this happens, the broth may be placed back in the blender to further homogenize its contents.

The broth is thus maintained at a temperature of between 130–150° F. for about 30–60 minutes, and during this time is continuously, or at least frequently, stirred to provide for uniform polymerization. If left unstirred at this temperature for about 3–5 minutes, a slight skin forms on the surface of the broth. However, as the polymerization continues, the broth thickens, becoming increasingly viscous until it reaches a consistency such that the carbon fibers are suspended within the broth as colloidal particles, and the broth becomes difficult to stir manually. When this point is reached, additional mixing using an electric kitchen mixer, or the like, for 5–10 minutes at this point liquifies the broth and imparts a homogenous consistency.

At this stage, the broth is poured into a mold or tray to a thickness between 3 mm and 10 cm, and more preferably between 1 cm and 3 cm. The lower thickness limit is driven by the need to have an electrode with sufficient structural rigidity so as to ensure that it does not easily crack or break, and preferably can even support its own weight. The upper thickness limit is driven by the need to prevent the innermost portion of the poured broth from exceeding about 150° F.–160° F. due to any residual exothermic polymerization.

It should be noted here that the temperature of the broth when it is poured should be in the range of 130°–150° F. or so. This helps ensure that when the broth sets, the resulting electrodes have isotropic mechanical and electrical properties. When the broth is poured at, or allowed to exceed, temperatures above 160° F., a runaway reaction takes place, resulting in electrodes having boils and other uneven surface and volumetric features. These result in an electrode with structural and electrical anisotropy. The above temperatures apply at atmospheric pressure. If, however, the reaction process is carried out under pressure, higher temperatures may be tolerated for obvious reasons.

Figure 11:
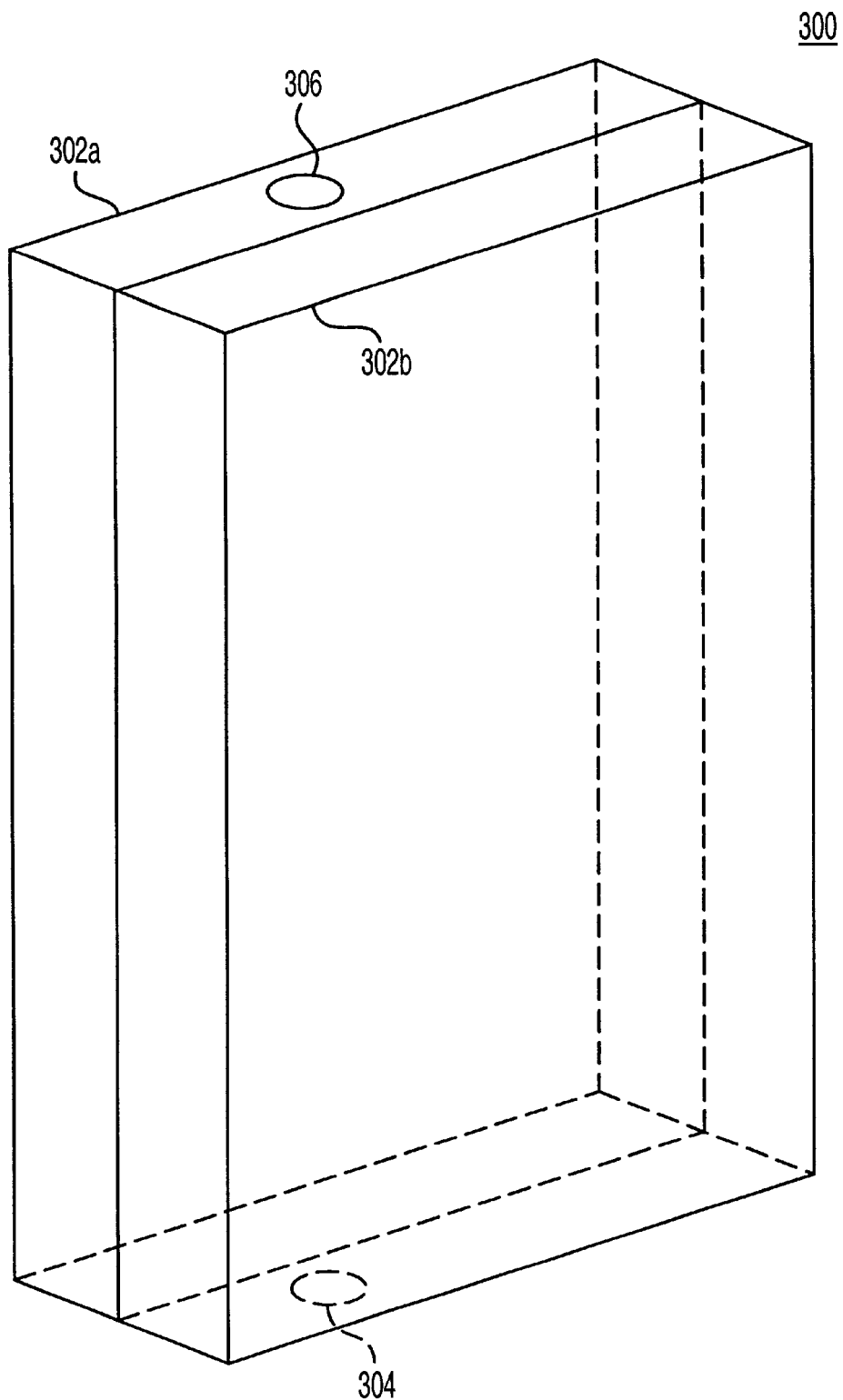
FIG. 11 shows an injection mold for use in the present invention

While the mold can be a substantially flat, open tray or other container into which the broth is poured, an injection mold such as that shown in FIG. 11 can be used instead. Injection mold 300 comprises two complementary portions 302*a*, 302*b* which mate to form an enclosure. One or both of the complementary portions is provided with an inlet 304 through which the broth is introduced and the injection mold is further provided with a vent 306. Injection can take place at a wide range of pressures, depending on the type of injection molding techniques uses, the viscosity of the injectant, and other factors.

Also, instead of injecting the mold with the broth, it may also be possible to inject the resorcinol-formaldehyde liquor, introduce the catalyst along with sufficiently small carbon fibers into the mold, and have the polymerization reaction take place entirely in the mold. Careful monitoring of the temperature would be needed, then, to ensure that the reaction proceeds at a proper pace.

In the preferred embodiment injection mold 300 has dimensions 8"×8"×1", although other dimensions may be used instead. Again, however, it should be kept in mind that it is harder to control the heat of reaction at the center of the material, once the broth or reactants have been poured to a large thickness in any mold, be it an open tray, an injection mold, or some other container. Too large a thickness can result in concentrating the heat within the material, which may lead to outgassing and deformation in the resulting product.

Regardless of how the reacted material winds up in the mold, it is allowed to cool in a controlled manner to remove heat. Cooling the mold in a controlled manner is preferred because it slows the polymerization and also helps ensure that the resulting electrodes have good anisotropic electrical properties. One way to cool the material is to place the mold or tray, covered with an approximately 30–40 minutes in a water bath; another way is to place the mold or tray sealed with aluminum foil, on a heat transfer surface such as a metal plate, and allowing the heat to be transferred to the metal plate until the mold or tray has cooled to about room temperature. Other cooling approaches, such as refrigeration coils and cool air convection may also be used to reduce the temperature of the tray or mold.

Cooling the poured broth causes it to harden somewhat into a block while still in the mold. In the preferred embodiment, the block is then placed in an oven having a circulating fan for maintaining an even temperature throughout the heating compartment. The block is then allowed to cure in the oven while still in the mold. For this in-mold curing stage, the oven temperature is set to between 80–98° F. and the mold is allowed to cure for approximately 20–30 hours. During this curing stage, the block shrinks by a small amount, and so is easily released from the mold. Upon conclusion of this stage, the in-mold cured blocks are hard, damp and wet with unreacted formaldehyde, and are electrically non-conductive. The purpose of the in-mold curing is to allow some hardening and shrinkage so that the block can be removed from the mold without damage to the block.

The removed in-mold cured blocks are sealed in an air-tight container, such as a plastic bag, and allowed to further cure in the oven at a temperature of between 80–98° F. for between 3–30 days. At the end of this anaerobic curing, the plates are hard and damp, but still electrically non-conductive. Experimentation has shown that if the blocks are cured for 1–2 days, the resulting electrodes are best suited for removing positive ions such as $Na^+$, $Ca^+$ and $Mg^+$, among others. And if the blocks are cured for 2–3 days, the resulting plates are best for removing negative ions, such as $SO_4^-$ and $NH_4^-$, among others. Experimentation has also shown that 5 days of curing is optimum to produce electrodes suitable for removing both negative and positive ions, with little advantage being gained if the blocks are cured for longer time periods. Thus, to an extent, one can tailor an electrode to the type of ions it is intended to remove.

After the non-conductive blocks have been cured, they are removed from the plastic bag and placed in an oven so as to fire and carbonize them into conductive plates. To prevent warping and deformation of a block during firing, one or more weights are placed on each block, at least close to the block's edges. In a preferred embodiment, the block is restrained with a force of approximately 0.5–0.8 lbs/in$^2$ in the form of refractory blocks which have already been heated to the temperature of the oven so as to prevent temperature shock. The exact pressure applied to each block is not critical, so long as it is sufficient to prevent warping in the final plate. It is however, preferably that the entire surface of the block not be covered in contact with a weight, lest carbonization be retarded.

Carbonization is performed by heating the blocks in the oven at a predetermined temperature, preferably between 965–975° C. Subjecting the blocks to this temperature causes further desiccation and burns off many of the impurities present in the original ingredients. The blocks are then heated for a predetermined period of time to complete carbonization. Experimentation has shown that the time of heating and the temperature of heating together depend on the weight of the unheated polymerized plate. Specifically, the time and temperature are "integrated" to provide a heating protocol of between 20 to 40° C.-minutes/gram of unheated polymerized plate. More preferably, a heating protocol of about 25–35° C.-minutes/gram is used.

Instead of firing the blocks for a predetermined period of time based on a protocol such as that described above, the blocks may be fired until they have reached a predetermined electrical characteristic, such as a particular conductivity or resistivity.

After the blocks are fired, they are removed from the oven and allowed to cool on a hardened surface for roughly 5 minutes, and are then flipped over and allowed to cool to room temperature. The result is a HSAAM plate ready to be machined.

Figure 12:
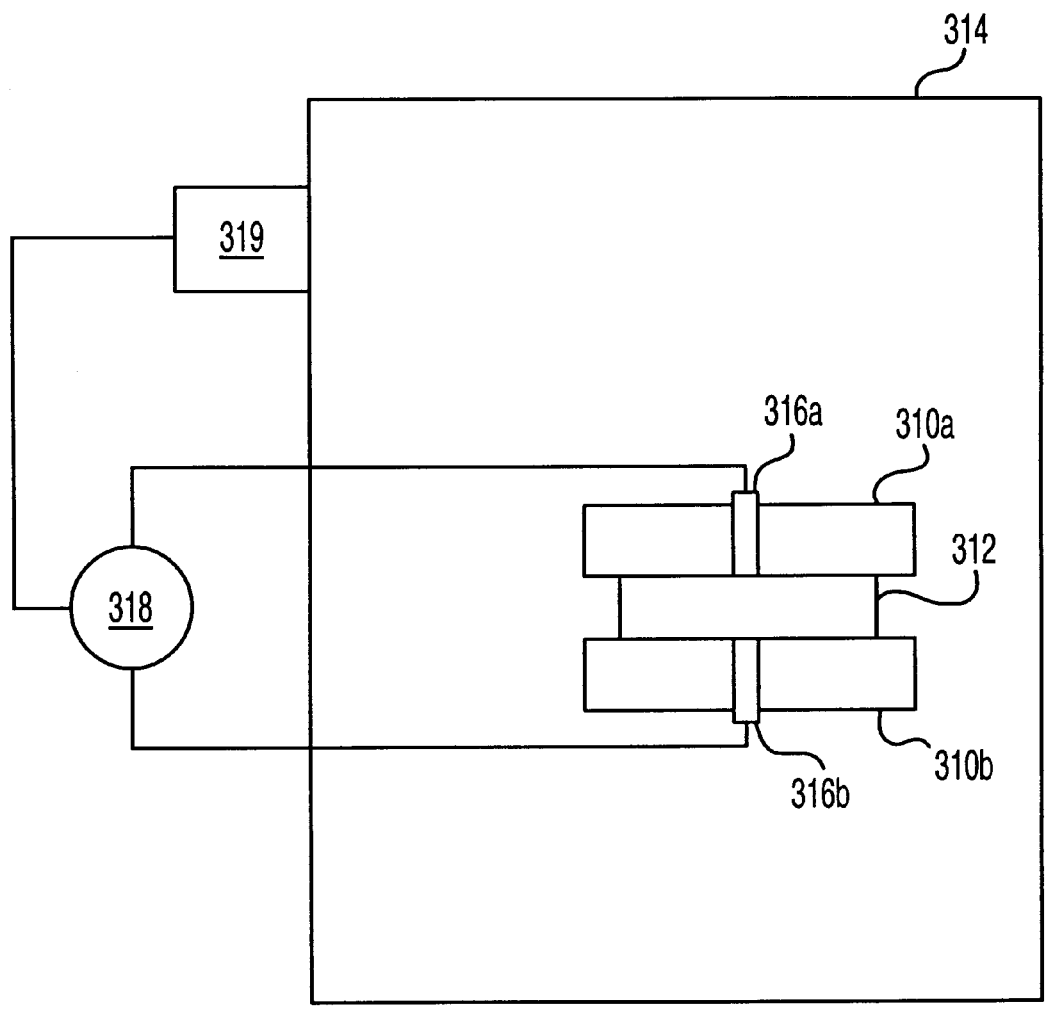
FIG. 12 shows an arrangement for automatically determining when firing is complete.

FIG. 12 shows an arrangement suitable to determine when the plates have reached a predetermined conductivity while in the oven. Conductive weights 310a, 310b, preferably made from graphite, are placed on either side of a block 312 which is being fired in the oven 314. Probes 316a, 316b each having a first end extending through openings in corresponding conductive weights 310a, 310b to contact the block 312, and a second end connected to meter 318 help measure an electrical property of the block 312 in situ. Meter 318, in turn, outputs a control signal to oven controller 319 which then regulates the oven in response thereto.

Although in the preferred embodiment, an electric muffle furnace having a top vent was used, the type of oven used for carbonization is not believed to be critical. However, experimentation has shown that heating the blocks in a nitrogen-pure, or inert-gas, atmosphere gives poor results as compared to heating these blocks in either air, or in a nitrogen-rich atmosphere. In the preferred embodiment, carbonization is carried out in an air environment, and so the heated blocks lose some material to burning as they are converted into conductive plates. However, this loss is not significant, since the blocks are substantially thicker than those formed in prior art techniques which required heating in a nitrogen or other inert gas atmosphere to prevent relatively thin blocks from being consumed during carbonization.

After carbonization, the plates are allowed to cool to room temperature in air. After cooling, or even before they are fully cooled, the resulting HSAAM plates can be machined and sanded into electrodes of a desired shape, size and thickness. Standard machine tools such as drills, carbide tipped table saws, sanding wheels and the like may be used for these purposes. Typically, the planar plates are cut into electrodes of suitable size for placing in a deionization apparatus. Preferably, the electrodes have a sufficient thickness to be self-supporting (e.g., able to withstand their own weight when placed on end). Plates thinner than this may be formed, but the brittleness of the material makes such thin plates difficult to handle and severely limits their capacity to remove and store ions from solution. In general, the thickness of the plate should be made in proportion to their surface area, larger plates typically needing to be thicker. Regardless of thickness, after carbonization, the block is a relatively good conductor of electricity.

The second embodiment for forming the blocks does not require carbon fibers to be blended into the liquor. Instead, the resorcinol-formaldehyde resin is reinforced by a carbon mat having a predetermined density of carbon and other materials and typically comprising a matrix or other suitable form of carbon. Thus, carbon mats formed from carbon felt, plain cellulose fiber, cellulose fiber impregnated with activated carbon, or the like can be used for this purpose. The carbon mat is cut to fit the mold, be it an open tray, an injection mold or some other container. The resorcinol-formaldehyde liquor, with the catalyst added, but without the added carbon fiber. The resulting broth is poured into the mold to cover the carbon mat, thereby displacing air trapped within the mat, and the mat is sealed in an air-tight container, such as a bag. The mold is then transferred into a curing oven set at between 80–92° F. and allowed to polymerize for approximately 72 hours so as to form a xero gel block, which is then fired in the same manner as in the first embodiment.

In a third embodiment, both carbon fibers and a carbon mat are used. In such case, however, a lower weight of carbon fibers and a lower density carbon mat are used, as compared to those used in the respective first and second embodiments.

Regardless of how a plate is made, when it is used in a deionization apparatus, it must be supplied with a voltage. This is preferably done with a rod or wire, such as formed from copper or other conductor. However, if the rod or wire is exposed to the liquid being deionized, the rod or wire will be damaged (by being sacrificed). Therefore, a dry connection between the rod or wire and the plate is preferably established.

Figure 13:
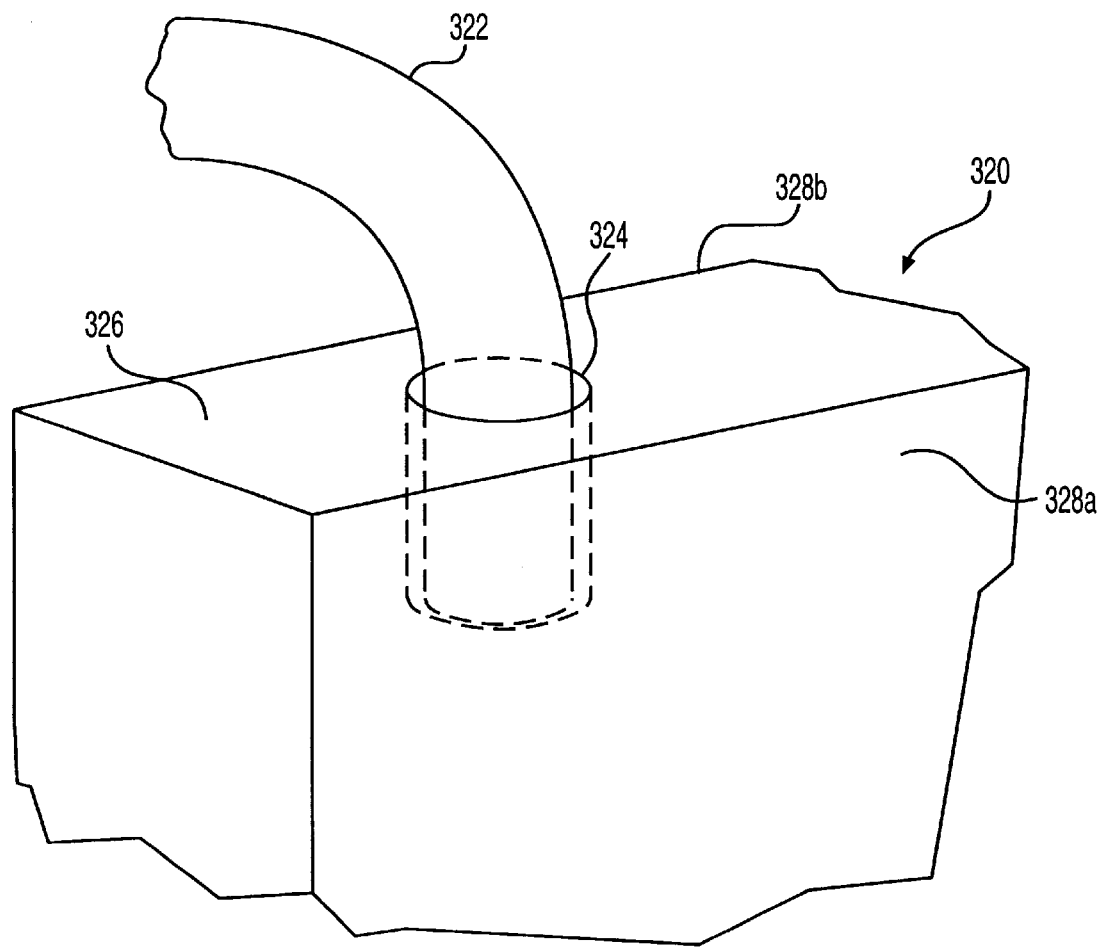
FIG. 13 shows an arrangement for forming an electrical connection with a plate.

FIG. 13 illustrates how such a dry connection may be made between a plate 320 and a conductor 322, preferably, an insulated copper wire between 8–14 AWG, also other thicknesses may be used. First, a hole 324 is drilled into the plate 320 and then tapped. The hole preferably has a diameter slightly smaller than a diameter of the stripped copper wire, and a depth of between ¼"–1". As to position, the hole is made in an edge 326 of the plate, in a direction parallel to the plate's two principal surfaces 328a, 328b. Alternatively, the hole may be drilled crosswise perpendicular to a principal surface at a position close to an edge. In either case, the end of the wire 322 is stripped to match the depth of the hole, and the exposed end portion of the wire is inserted into the hole to form a snug fit against the conductive plate. After the wire has been inserted, the plate is saturated with a marine grade nonconductive epoxy, such as 2-part epoxy resin #2, from Fibre Glass Evercoat, of Cincinnati, Ohio. The nonconductive epoxy seals the region around the copper wire, while not disturbing the preexisting electrical connection between the exposed wire and the plate.

It should be noted here that the sealed electrical connection may also be made by first saturating the plate with the nonconductive epoxy, drilling the hole, inserting the stripped copper wire and then applying additional epoxy to form the seal. Other variations may include forming a channel, rather than a simple hole, in the edge of a plate, and then inserting a wide strip of an electrical connector before sealing with epoxy. The basic principle is to form an electrical connection in a region of the plate and then seal the area surrounding the connection with a material that preferably does not affect the electrical properties of the plate.

The plates made in accordance with the present invention typically comprise a porous matrix structure having a surface area of about 540 m$^2$/gram. In addition, the conductivity of a plate does not appear to be affected when the porous structure is saturated with a nonconductive material, such as a nonconductive epoxy. The porosity is such, that liquids such as water, even with some dissolved solids, can pass through a plate. Such liquids can be deionized by being passed through the plates, either by gravity, or under pressure.

Figure 14:
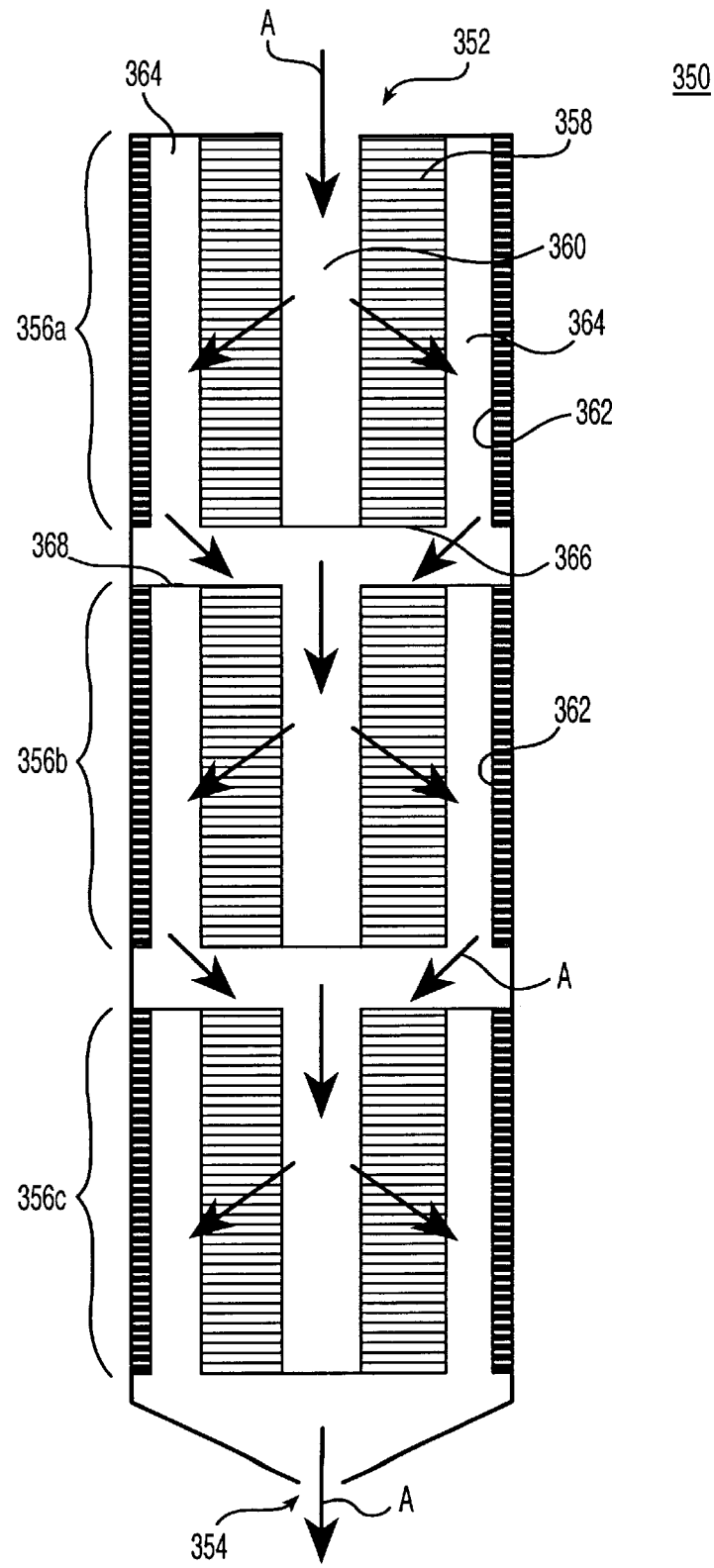
FIG. 14 shows a tank configuration for flow through HSAAM plates.

FIG. 14 shows an embodiment of a deionizing tank 350 in which the liquid is intended flow through the plates to be deionized. The tank 350 has an inlet 352 at one end through which the liquid to be deionized is introduced, and an outlet 354 at an opposite end through which the deionized liquid exits. The arrows A in the figure show the direction of liquid flow. It should be noted, however, that a portion, or even all, of the output stream may be redirected to the input so as to further deionize the liquid for a batch processing-type operation.

The tank 350 includes a plurality of flow cells 356a, 356b, 356c. Though only three flow cells are shown in the figure, it should be kept in mind that any number may be provided. The flow cells are positioned between the inlet and the outlet, each flow cell contributing to deionization. Each flow cell may have a different voltage polarity and differential applied between the HSAAM plates and the non-HSAAM plates using appropriate electrical connections, as discussed above. In the embodiment of FIG. 14, each flow cell comprises a pair of parallely arranged HSAAM electrodes 358 with a channel 360 therebetween. Each of a pair of non-HSAAM electrodes 362 is arranged parallel to and spaced apart by a passage 364 from a corresponding one of the HSAAM electrodes 358.

The embodiment of FIG. 14 shows the HSAAM electrodes of a single flow cell facing one another. It should be understood, however, that may instead employ a configuration in which each HSAAM electrode is bordered on one side by an inner non-HSAAM electrode and on the other side by an "outer" non-HSAAM electrode, as discussed above with respect to FIGS. 4a & 4b. In such case, the principal channel would be between the two inner non-HSAAM electrodes associated with different HSAAM electrodes. In such a configuration, the liquid would enter the channel, pass through the inner non-HSAAM electrodes, through the HSAAM plates into the passage 364, and onto the channel of the next flow cell. For this to happen, however, the non-HSAAM electrodes must permit liquid to pass therethrough. This can be done, for example, by using a carbon-cloth non-HSAAM electrode mounted on a grid or perforated backing, preferably formed from plastic or other non-conductive material.

In the embodiment of FIG. 14, the liquid enters the channel 360 of a first flow cell 356a, passes through the HSAAM plates of that flow cell into the passage 364 and then is guided into the channel of the next flow cell 356b. The flow cells are provided with a channel baffle 366 to urge the liquid to pass through the pores in the plates rather than between the plates and onto the adjacent flow cell. Each flow cell is also provided with a passage baffle 368, or barrier, which prevents liquid from the passage 364 of a first flow cell from directly entering the passage of a next flow cell. This helps ensure that liquid enters a flow only via its channel.

The tank 350 of FIG. 14 is one of many ways in which the porous HSAAM plates can be arranged to permit liquid to pass therethrough. The tank 350 substantially allows the liquid to flow principally in one direction, i.e., from an inlet at one end, to an outlet at the opposite end of the tank. It should be kept in mind, however, that other configurations may be provided. Since deionization can be performed with the liquid passing through the plates, a plurality of plates may be arranged in a number of different orientations with the liquid flowing towards one or more outlets or collection areas such as holding tanks, chambers or other enclosures. For instance, if the plates are arranged as several, if not all, of the facets of a pyramid, cube, dodecahedron or other three-dimensional structure or portion thereof, the liquid may be forced into the three-dimensional structure through one or more of these plates from the outside under pressure. The three-dimensional structure itself may be placed in a larger container to prevent spillage of the liquid to be deionized. The deionized liquid and any flock may be removed from the common enclosure via one or more conduits communicating with the exterior.

While the plates described thus far are substantially flat, it should also be kept in mind that curved plates, and plates of virtually any shape may be created using techniques such as those employed in the plastics or ceramics industries. Thus, plates may be formed to take on a spherical, cylindrical or other curved morphology better suited for a particular application.

Regardless of the number and shape of the plates, the arrangement of plates in a tank, or the three dimensional configuration of the plates, positive pressure may be applied to the liquid to force it through the plates. Similarly, a pump or the application of negative pressure by suction may be used to remove deionized liquid from a tank, enclosure or other container.

In the preferred embodiments discussed above, resorcinol is used as one of the ingredients. However, experimentation has shown that suitable blocks can be formed using one of the following chemicals in place of resorcinol: 1,5-dihydroxy naphthalene, 2,3-dihydroxy naphthalene, 1,4-dihydroxy naphthalene and 1,4-dihydroxy benzene. Each of these chemicals was found to form a polymer with formaldehyde, successfully carbonized into a block, and subsequently deionized water when a current was applied. In general, then, it is believed that any dihydroxy or trihydroxy benzene or naphthalene can be used in place of resorcinol. This is because these chemicals are similar in chemical structure, share the characteristic of forming a polymer with formaldehyde, and are likely to form carbonized blocks which can be used in ion removal. Presently, resorcinol is preferred because of its low cost, its wide availability in large quantities, and its amenability to reacting with formaldehyde at room temperature and pressure.

An electrode formed in accordance with the above process has a number of properties. Adequate electrodes have a mass resistivity ranging from $2 \times 10^5$ to $1.3 \times 10^6$ micro-ohm cm, and a density ranging from 0.49–0.79 g/cc. The electrodes preferably also have structural properties which allow the electrode to be self-supporting, machinable, and able to receive a direct electrical connection.

Figure 15:
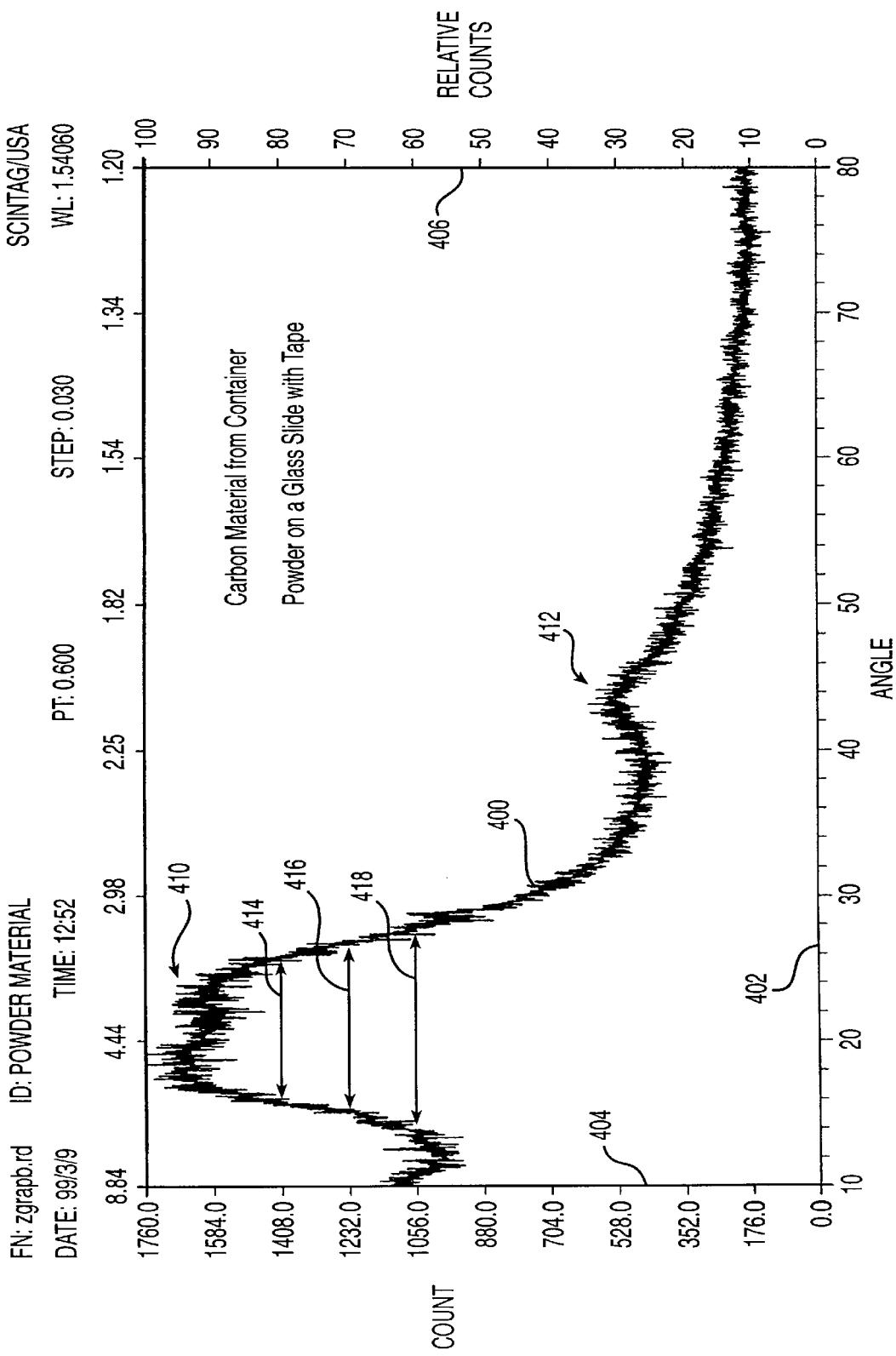
FIG. 15 shows an X-Ray diffraction curve of a sample of HSAAM material made in accordance with the present invention.

The microscopic structure of an HSAAM electrode is somewhat more difficult to characterize. However, FIG. 15 shows an X-ray spectral measurement curve 400 for a powdered sample of HSAAM Electrode material. In FIG. 15, the bottom abscissa 402 corresponds to the angle, the left ordinate 404 represents the absolute number of counts and the right ordinate 406 represents the relative number of counts. As seen in this figure, the X-ray spectral measurement curve for the HSAAM material exhibits a broad swath 410 and a lesser peak 412 around 43°.

The swath 410 of FIG. 15 can be characterized by its width at various percentages of the normalized swath peak value. At the 80% of peak value level 414 the swath runs from about 16° to 25° for a width of about 9°. At the 70% of peak value level 416, the swath runs from about 15° to 26° for a width of about 11°. At the 60% level, the swath runs from about 13° to 27° for a width about 14°.

Figure 8:
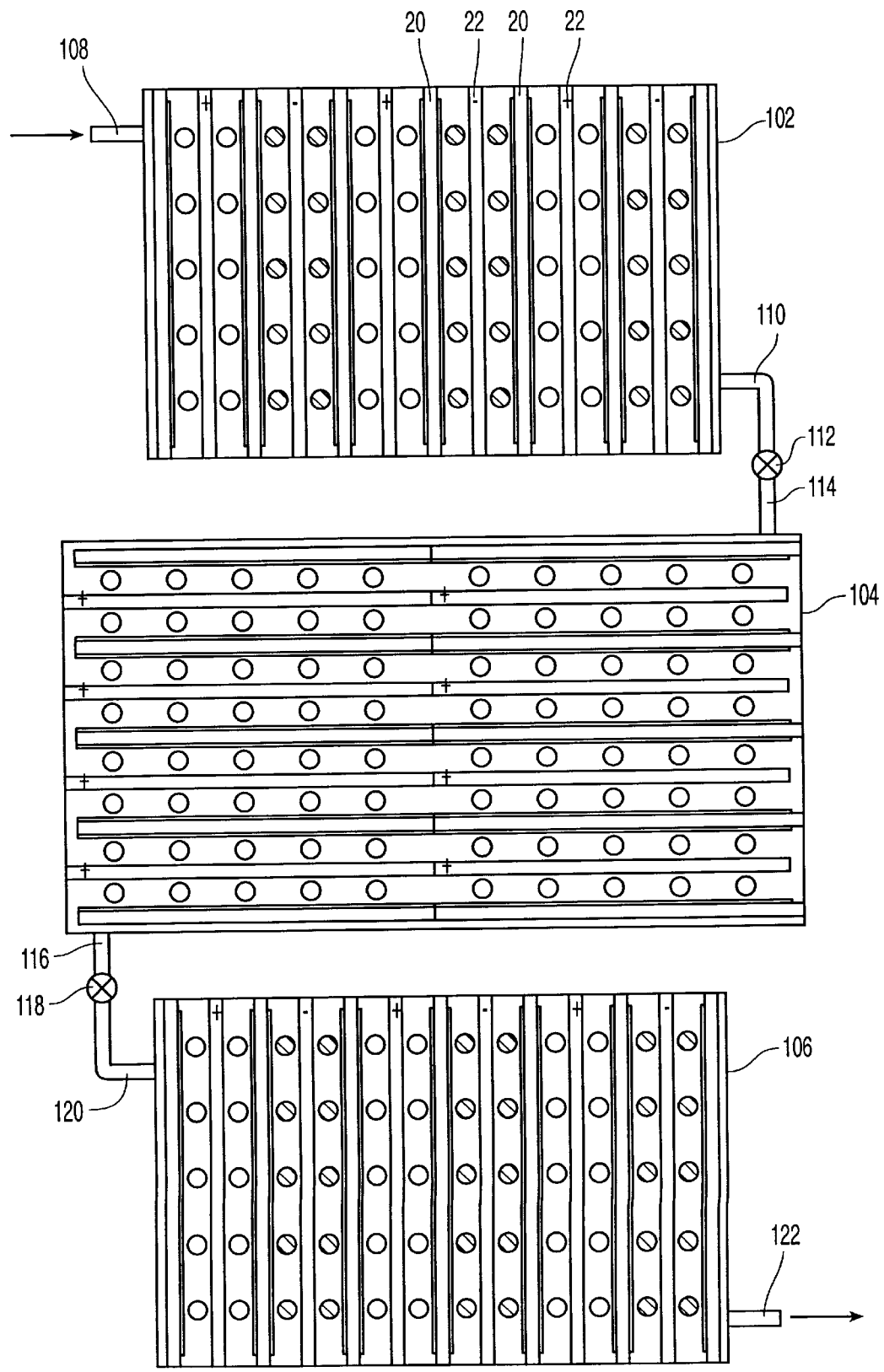
FIG. 8 shows an experimental apparatus constructed along the lines of that shown in FIG. 5.
Figure 9A:
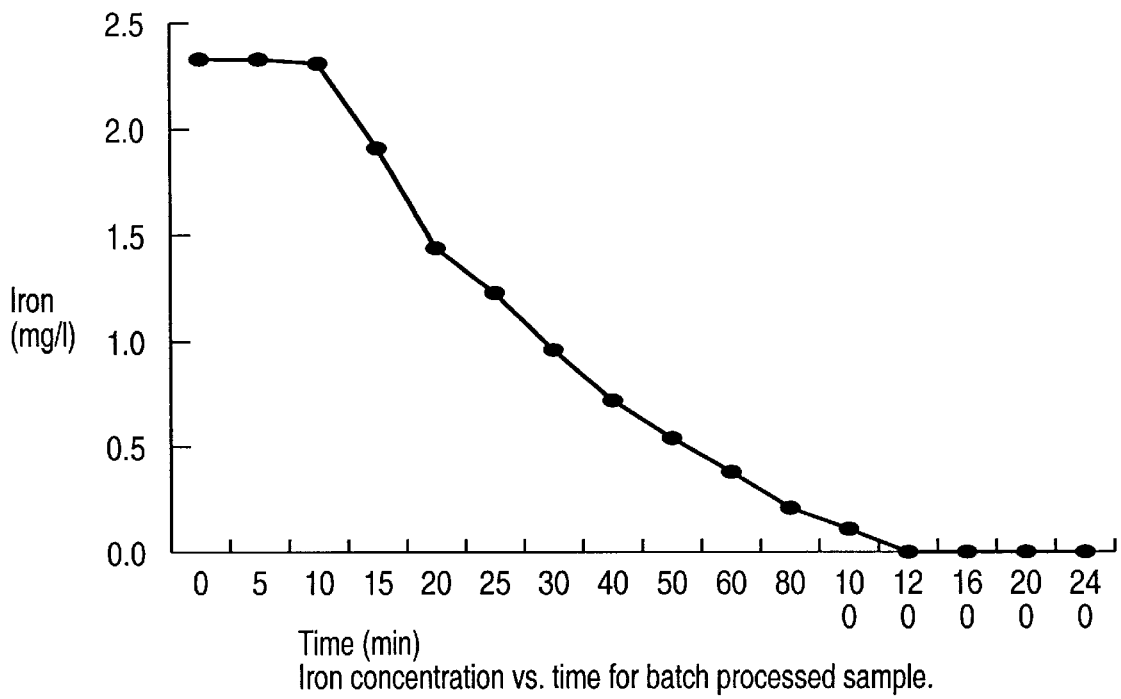
FIGS. 9A–9E present batch processing results using the apparatus of FIG. 8.
Figure 9B:
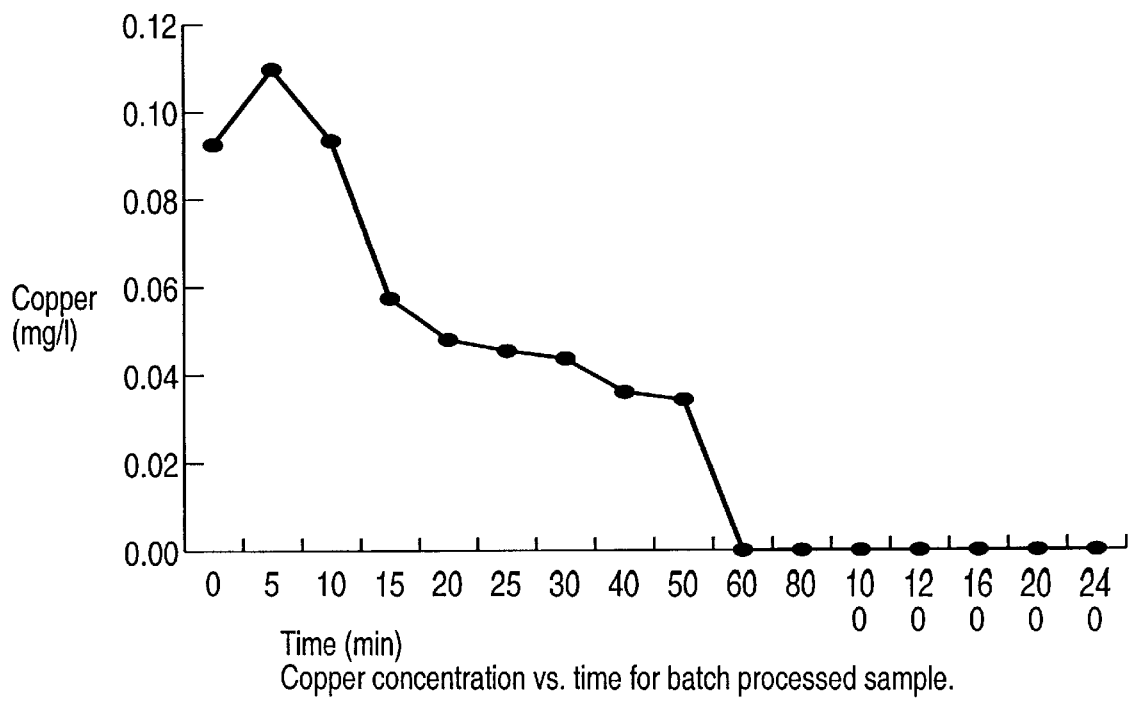
Figure 9C:
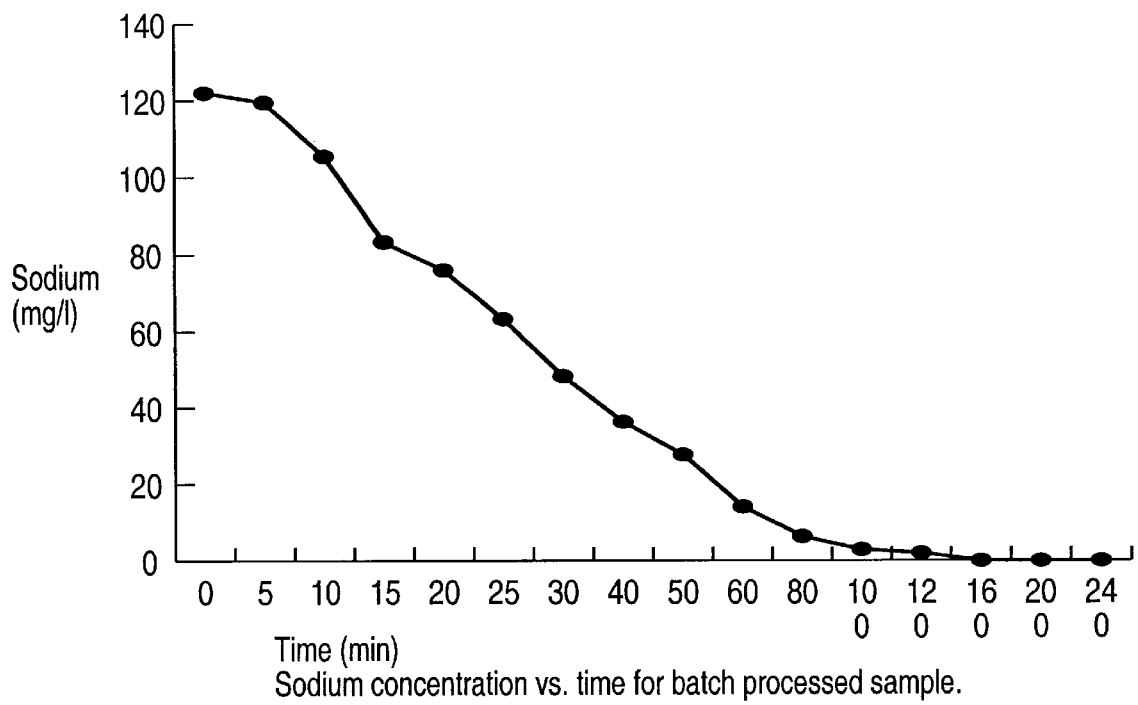
Figure 9D:
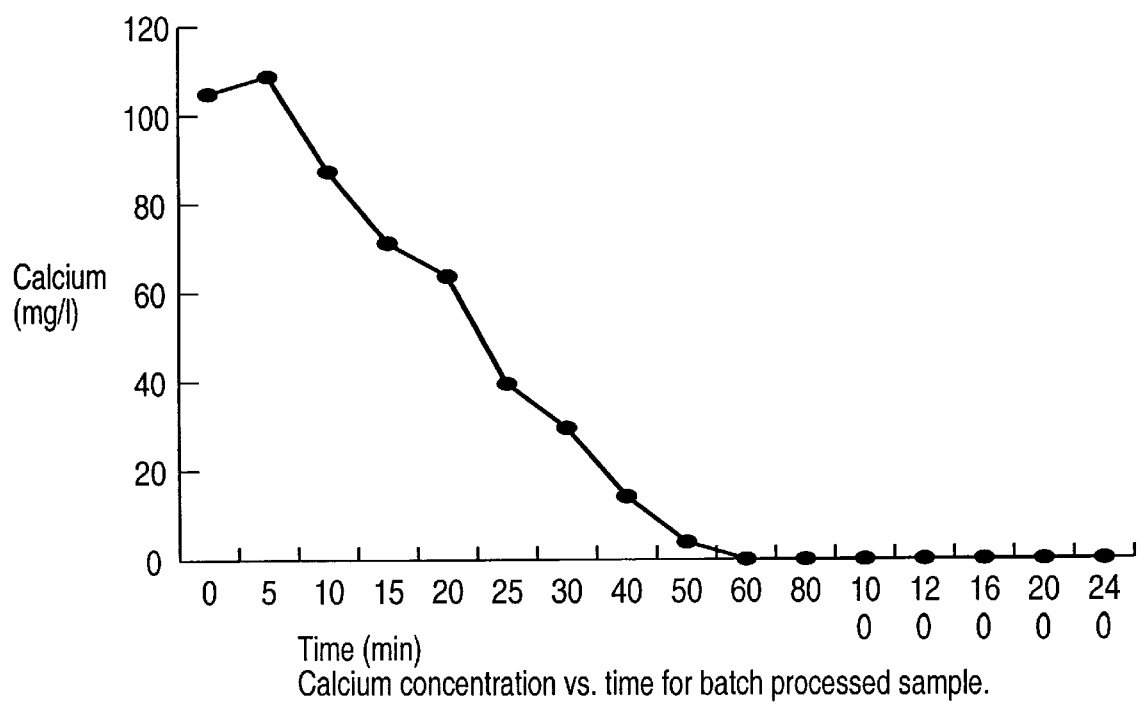
Figure 9E:
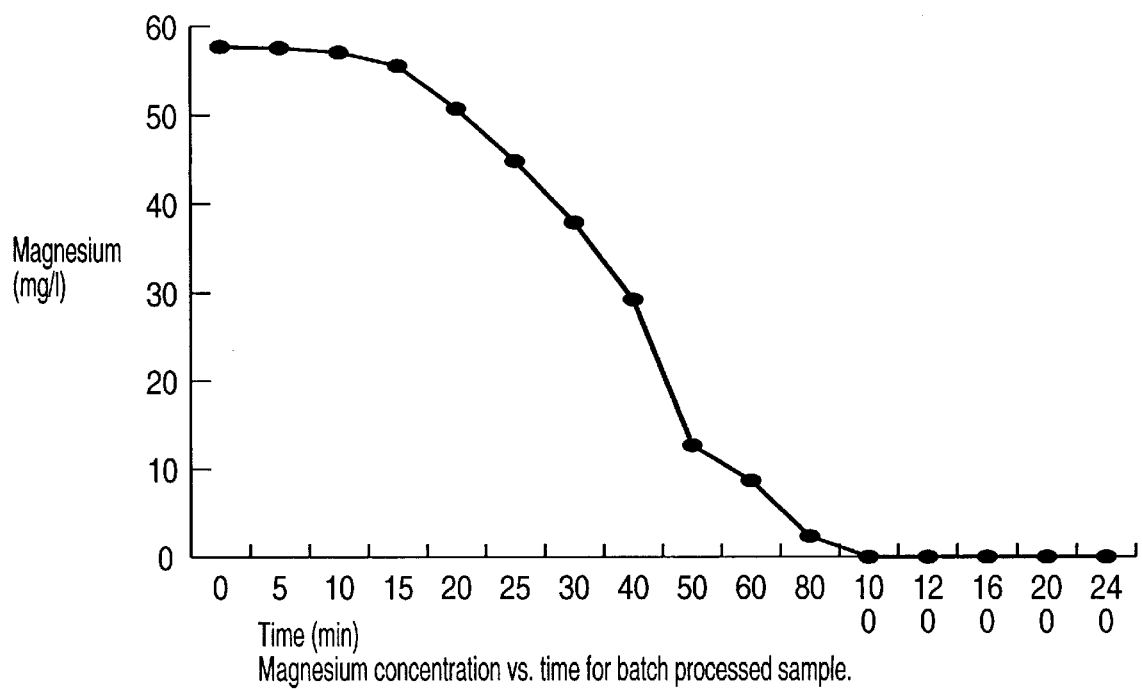

FIG. 8. illustrates another apparatus constructed in accordance with the present invention. This apparatus comprises three tanks 102, 104, 106. The three tanks were used in series to deionize city of Pueblo, Colorado sewage effluent. The effluent was introduced at the inlet 108 to the first tank 102 and the final product exited the system from outlet 122 of tank 106. Overall, the system could deionize up to 1500 milliliters per minute (ml/min).

In this system, tanks 102 and 106 had identical construction. Each was provided with six deionization cells. In both tanks, 102, 106, the HSAAM electrodes in adjacent deionization cells had different polarities. This gave a voltage-interleaved deionization arrangement in each tank. As a consequence, both tanks 102, 106 were arranged to take out both positive and negative ions. Therefore, each of these tanks had two voltage sources, one voltage source arranged to create positively charged deionization cells, and a second voltage source arranged to create a negatively charged deionization cells.

Tank 102 was connected to intermediate tank 104. The partially deionized effluent from tank 102 passed through outlet 110, valve 112, inlet 114 and on into second tank 104. Although shown as a single inlet, inlet 114 was in fact a multiplicity of conduits entering second tank 104. The purpose of valve 112 is to interrupt the electrical conduction process between tanks 102 and 104. Also, outlet 110 of tank 102 may be provided with a bleed (not shown) to test the partially deionized effluent to assess the performance of tank 102.

Tank 104 is also provided with six deionization cells. However, these deionization cells are of double length. The HSAAM electrodes of each are provided with a rabbit joint at their ends so that they can mate with a complementary structure on a similar plate. In contrast to tank 102, all the deionization cells in tank 104 have positively charged HSAAM electrodes. This means that only negative ions are removed in tank 104.

The further deionized effluent from tank 104 exits through outlet 116, passes through valve 118, enters inlet 120, and from there enters tank 106 itself. Outlet 116 may also be provided with a bleed so as to sample the effluent from tank 104.

As stated above, tank 106 is similar in construction to tank 102. It further deionizes the liquid entering inlet 120. The deionized output from tank 106 exits the system at outlet 122.

In tanks 102 and 106, the HSAAM electrodes were 6½"×13"×0.4" and were formed from 2 plates of dimensions 6½×6½"×0.4". To form the plates of tanks 102, 106 a 0.25" rabbit joint was cut in one edge and a complementary joint was cut in an opposing edge from an abutting plate. The two plates were fitted into frames and were glued end to end with a conductive epoxy. For tank 104, four plates were fitted in a similar process. For all tanks, electrical connection was made with a carbon fiber wire that was adhesively joined, such as by epoxy, to the clips mounting the HSAAM plates to the frame.

In tanks 102 and 106, water was introduced into each tank near the top of the HSAAM electrodes at a single point. Once inside the tank, the water was mixed continuously during deionization. The purpose of mixing is to help prevent the creation of localized acidic or caustic regions of the tank, during deionization. Mixing can be accomplished by aerating the tank at multiple points along the bottom of that tank, although other mixing means, such as magnetic or mechanical stirrers and spinners may be used instead. The overall retention time of water in a given tank, was determined solely by the flow rate which, as stated above, under 1500 ml/min.

As an alternative to introducing water at a single point in each of the tanks, one may provide multiple inlets in each tank, at one end of the HSAAM and non-HSAAM plates, and multiple outlets at the other end of the plates. In such case, the water would travel the length of a deionization cell before exiting.

Tanks 102 and 106 had voltages applied to them which were dependent on the conductivity of water being deionized. Applied voltages range from 0.01–15 volts during the deionization in these two tanks. The corresponding amperage ranges from 0.01–10 amps during deionization. The deionization rate of the water (i.e., the rate at which ions were removed) was a function of the type of water being deionized. Hence, the rate for deionization in tank 102, which had more impurities, was greater than that of tank 106, which was treating water that had been twice deionized.

The second tank, 104 removed negatively charged ions. This resulted in the water in this tank becoming caustic, thus creating a caustic flock. The second tank was operated in a serpentine flow pattern with the inlet being placed near the bottom of the HSAAM plates. The voltage and current applied to the water within tank 104 was sufficient to cause electrolysis of the water. Treatment of water in this second tank resulted in the removal of approximately 300–500 $\mu$mho/cm or $\mu$S/cm of conductivity. However, the caustic output from this tank had a pH in the range of 8–12, which then was sent on to the third tank 106.

Table 1 shows the experimental results achieved using the system of FIG. 8. In particular, Table 1 shows the effects of each stage of deionization using an apparatus formed in accordance with the present invention. The values reported in Table 1 indicate that the output from tank 106 (the last tank) is consistent with potable water, as it meets the limitations for Federal water standards.

TABLE 1

| Parameter | Enter System | Exit 102 | Exit 104 | Exit 106 |
| --- | --- | --- | --- | --- |
| Conductivity $\mu$g | 2000 | 1300 | 900 | 500 |
| pH Range | 7.1–7.7 | 3.3–11.2 | 10.1–12.4 | 6.6–7.2 |
| Total Hardness | 560 | 492 | 342 | 144 |

TABLE 1-continued

| Parameter | Enter System | Exit 102 | Exit 104 | Exit 106 |
|---|---|---|---|---|
| mg/l | | | | |
| Total Coliform (colonies/100 ml) | over grown | 456 | 5 | 0 |
| Total Alkalinity mg/l | 280 | 60 | 60 | 10 |
| Ammonia mg/l) | 17.1 | 12 | 6 | 4 |
| Total Dissolved Solids mg/l | 1188 | 781 | 540 | 300 |
| Sulfates mg/l | 840 | 830 | 423 | 400 |
| Chloride mg/l | 28 | 10 | 8 | 3 |
| Odor | strong | mild | absent | absent |
| Color | clear green | clear green | clear colorless | clear colorless |

Deionization of City of Pueblo, Colo. Sewage Effluent Using the System of FIG. 8.

Table 2 shows the experimental results achieved using the system of FIG. 8. In particular, Table 2 shows the effects of each stage of deionization using an apparatus formed in accordance with the present invention.

TABLE 2

| Parameter | Enter System | Exit 102 | Exit 104 | Exit 106 |
|---|---|---|---|---|
| Conductivity $\mu$S | 1240 | 860 | 680 | 300 |
| pH range | 3.2–4.2 | 7.1–7.6 | 8.6–11.1 | 7.1–7.7 |
| Color | opaque/orange | clear orange | clear/colorless | clear/colorless |
| Total Arsenic $\mu$g/l | 2 | not tested | >mdl | >mdl |
| Total Cadmium $\mu$g/l | 137 | not tested | 100 | 45.7 |
| Total Copper $\mu$g/l | 40 | not tested | 25 | 11 |
| Total Iron $\mu$g/l | 4060 | not tested | 456 | 176 |
| Total Lead $\mu$g/l | 8 | not tested | >mdl | >mdl |
| Total Manganese $\mu$g/l | 13800 | not tested | 5370 | 2970 |
| Total Zinc $\mu$g/l | 38600 | not tested | 23000 | 11400 |
| Total Hardness mg/l | 980 | 376 | 64 | 34 |
| Total Alkalinity mg/l | 0 | 70 | 176 | 72 |
| Sulfate mg/l | 778 | 414 | 231 | 39.8 |
| Chloride mg/l | 16.7 | 4.8 | 4.8 | 5.8 |
| Calcium Hardness mg/l | 240 | 276 | 64 | 34 |
| Magnesium Hardness mg/l | 740 | 100 | >mdl | >mdl |

Treated Super Fund Site of Yak Tunnel/California Gulch operated by Asarco, Inc. near Leadville, Colo., deionization results of the system of FIG. 8.

In addition to continuous flow deionization, the apparatus can also be used for batch process deionization. Results of batch processing are given by FIGS. 9A–9E. In particular, these figures show the results of deionizing a batch of water spiked with known concentrations of iron, sodium, and copper ions. Iron and copper ions were removed to a level below 1 part per billion, sodium ions were removed to a level below 2 parts per million, and conductivity was reduced from 12,150 $\mu$S to 410 $\mu$S.

The pH and conductivity level of the water in each of the three tanks was monitored to establish when the HSAAM plates were saturated. A rise in the conductivity of the water outflow without a corresponding change in the pH indicates that the HSAAM plates were saturated with ions and that the apparatus needs to be regenerated. Similarly, stored charge in conjunction with pH & conductivity in the cell can be used to indicate when the apparatus needs to be regenerated. In general, HSAAM plates become discolored as they deionize the water. The type and color of change depends on the type of water being treated. For instance, water having high sulfate levels causes the plates to turn white as the sulfate is deposited on them. Similarly, water having high organic waste content causes the HSAAM plates to turn to a brown color. Either way, this discoloration indicates that regeneration is necessary due to ion saturation levels.

With tanks 102 and 106, it was possible to either form an oxidized flock or a concentrated ion solution during regeneration. Whether one or the other was created, depended upon the voltage level applied. Applying a voltage lower than that necessary to cause the electrolysis of water, allowed one to collect the ion rich water from the negatively or positively charged deionization cells via the bottom holes 82, 84, as shown in FIG. 7. On the other hand, applying a voltage sufficient to electrolyze the water, resulted in the formation of an oxidized flock. In such case, mixing was required during regeneration to produce and discharge this flock from the tank.

In the second tank, 104, negatively charged ions were removed. This resulted in the water becoming caustic, resulting in a pH on the order of 8–12. This also resulted in the formation of a caustic flock. During operation, the voltage applied to the deionization cells in tank 104 was sufficient to cause electrolysis of water. Thus, the voltage applied was on the order of 1 to 12 volts with an amperage of between 1.3–12 amps. The effect of this was that the second tank, 104, caused the removal of 300–500 $\mu$mho/cm or $\mu$S/cm of conductivity.

Regeneration of the plates in the second tank, 104, was conducted by reversing the current applied to the plates with enough voltage to overcome the cells' stored charge (counter EMF). Again, a rise in the conductivity of water outflow without a change in pH, indicated that the HSAAM's in the second tank 104 were saturated with ions, signifying that the apparatus needed to be regenerated. This could most easily be discerned by the fact that the HSAAM plates became severely discolored, the type and color of change depending on the type of water being cleaned. During regeneration, an oxidized flock was produced by operating the device at a voltage needed to counter the EMF that had built up during the operation of the system.

These flocks could then be collected through the holes in the bottom of the tank 104. After regeneration, all three tanks 102, 104, 106 can then be reused with the same efficacy as before.

The power supplies used to supply the necessary voltages for deionization preferably can be controlled over a finite range of voltages. Typically, then, the power supplies will be of the type that can be plugged into an AC outlet. However, as fairly low voltages and currents are needed, portable, battery-powered power supplies may be used in certain settings. In this vein, a solar-powered deionization apparatus has been constructed and successfully operated, albeit at a low throughput. Solar-powered and battery-powered systems of reduced size provide the dual advantages of low cost and high portability.

Figure 10:
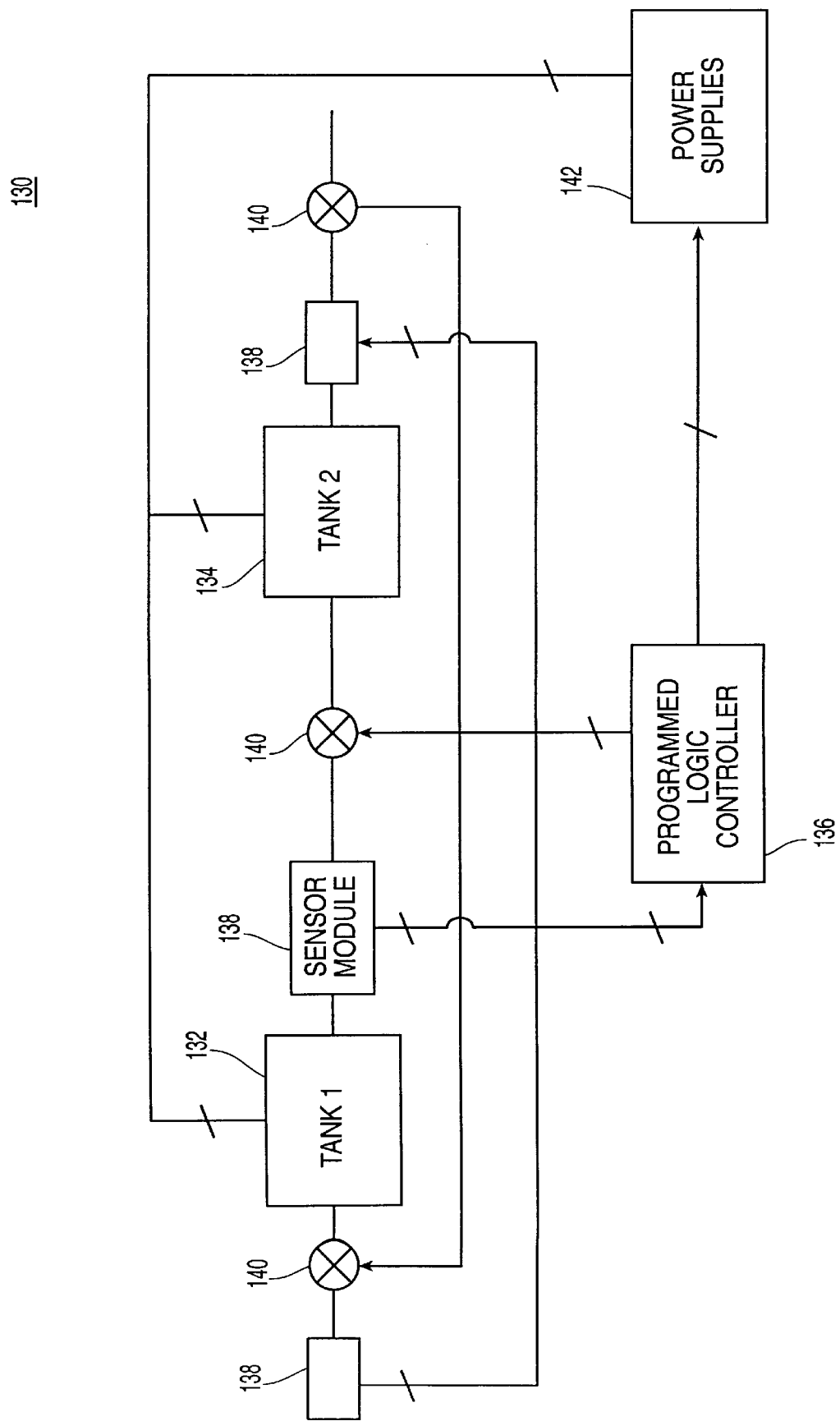
FIG. 10 presents a block diagram for an automated deionization apparatus.

FIG. 10 shows an overview of an automated deionization control system 130 in accordance with the present invention.

The system monitors the water quality to automatically adjust the voltages to achieve a target rate of deionization. As shown in this figure, the system 130 controls the operation of two tanks 132, 134. It should be kept in mind, however, that a control system could also be used with either a single tank, or with three or more tanks, be they connected in serial, or in parallel, or in a combination of the two.

The control system uses sensor modules 138, which monitor the effluent at various stages in the deionization plant. These sensor modules 138 comprises one or more sensors configured to gauge such properties as pH, conductivity, water flow rate, temperature, optical characteristics, etc., of the effluent. The sensor modules may also include ion-specific probes, such as those measuring fluoride, ammonia, chloride and others, such as those listed in Tables 1 & 2. The sensors may sample the effluent continuously, at predetermined periodic intervals, or upon request from the controller 136. While in the preferred embodiment, the sensors are shown to sample the effluent in the piping connecting to a tank, the sensors may be placed inside a tank, as well.

The sensors data is presented to a programmed logic controller 136. The controller may be implemented as a microprocessor, or equivalent. The controller 136 assesses the performance of the tanks 132, 134 based on the sensor data. The controller uses these data to determine whether any changes in the flow rate and the flow pattern should be made. If so, the controller outputs signals to motor-driven valves 140 to adjust the flow rate. These valves may be controlled either simultaneously, or individually. In cases where there are multiple inlets or multiple outlets, it may be possible to control only a subset of these so as to ensure no overflow of any of the tanks.

In addition to selectively controlling the flow rate, the controller 136 also controls the voltages applied by the various power supplies, shown generally as 142. In particular, the controller processes the sensor data and outputs control signals to the power supplies, to thereby control the voltages and/or currents applied to the deionization cells in the tank. The controller 136 uses the sensor data to determine whether the electrodes in the tank need to be regenerated and, if so, outputs the appropriate signals to the power supplies to effect this.

A control system as described above may be useful in a large scale deionization apparatus capable of handling flow rates on the order of several thousands of gallons per hour. Thus, such an apparatus may be scaled up to serve the deionization needs of industrial plants, city water and sewage treatment plants, and the like. Experimental results have shown that the electrode dimensions and the number of electrodes can be increased linearly without significantly impacting either the voltage applied or the current drawn.

It should be noted that the apparatus of the present invention does not, strictly speaking, perform capacitive deionization in that the non-HSAAM (non-absorptive) electrodes never actually store a charge. Indeed, ions are never deposited on these electrodes, regardless of how these electrodes are charged; only the HSAAM electrodes ever trap and store ions.

It should also be noted that the foregoing preferred embodiments teach the formation and use of planar electrodes. However, alternate electrode and deionization cell geometries may also be used. One such example is an annular deionization cell comprising 1) an solid or annular inner non-HSAAM electrode, 2) an annular HSAAM electrode concentric with the inner non-HSAAM electrode, and 3) an annular outer non-HSAAM electrode, concentric with the first two electrodes. Such an arrangement would allow for fluid flow between the annular HSAAM electrode and the two non-HSAAM electrodes. However, in such an arrangement, the inner and outer non-HSAAM electrodes would have different surface areas facing the HSAAM electrode. Therefore, it may be necessary to use either different voltages or currents between the two non-HSAAM electrodes and the HSAAM electrode sandwiched between the two.

While the present invention has been disclosed with reference to certain preferred embodiments, these should not be considered to limit the present invention. One skilled in the art will readily recognize that variations of these embodiments are possible, each falling within the scope of the invention, as set forth in the claims below.

What is claimed is:

1. A carbon-reinforced electrode comprising:
   at least one from the group consisting of dihydroxy benzenes, trihydroxy benzenes, dihydroxy naphthalenes and trihydroxy naphthalenes and mixtures thereof;
   formaldehyde;
   a carbon reinforcing agent; and
   a catalyst;
   or reaction products thereof, together in a carbonized form,
   wherein said electrode has a thickness between 3 mm and 10 cm and the carbon reinforcing agent is substantially dispersed throughout said thickness.

2. The electrode of claim 1, wherein said carbon reinforcing agent comprises one from the group consisting of pitch based carbon fibers, carbon felt and cellulose, and mixtures thereof.

3. The electrode of claim 2, wherein:
   said carbon reinforcing agent comprises pitch based carbon fibers having an average length less than 1".

4. A method of deionizing a liquid comprising providing a carbon reinforced first electrode comprising:
   at least one from the group consisting of dihydroxy benzenes, trihydroxy benzenes, dihydroxy naphthalenes and trihydroxy naphthalenes and mixtures thereof;
   formaldehyde;
   a carbon reinforcing agent; and
   a catalyst;
   or reaction products thereof, together in a carbonized form,
   wherein said electrode has a thickness between 3 mm and 10 cm and the carbon reinforcing agent is substantially dispersed throughout said thickness; and
   passing said liquid through a thickness of said electrode while a voltage is applied to said electrode.

5. The method of claim 4 comprising also passing the liquid through a thickness of a second electrode formed from a material different from said carbon-reinforced first electrode, said second electrode being spaced apart from said first electrode.

6. A carbon-reinforced electrode formed by:
   dissolving at least one from the group consisting of dihydroxy benzenes, dihydroxy naphthalenes, trihydroxy benzenes and trihydroxy naphthalenes and mixtures thereof, in formaldehyde to form a liquor;
   combining the liquor with a carbon reinforcing agent to form a broth;

maintaining the broth for a sufficient time and at a sufficient temperature until the resorcinol and formaldehyde polymerize to a consistency such that the carbon reinforcing agent does not settle in the broth;

pouring the broth to thickness of between 3 mm and 10 cm;

curing the broth for a sufficient time and at a sufficient temperature such that the broth sets into a solid; and firing the solid for a sufficient time and at a sufficient temperature such that the solid carbonizes into an electrically conductive plate.

7. The electrode of claim 6, wherein said carbon reinforcing agent comprises one from the group consisting of pitch based carbon fibers, carbon felt and cellulose, and mixtures thereof.

8. The electrode of claim 7, wherein:

said carbon reinforcing agent comprises pitch based carbon fibers having an average length less than 1".

9. A process for forming a carbon-reinforced electrode comprising:

dissolving at least one from the group consisting of dihydroxy benzenes, dihydroxy naphthalenes, trihydroxy benzenes and trihydroxy naphthalenes and mixtures thereof, in formaldehyde to form a liquor;

combining the liquor with a carbon reinforcing agent to form a broth;

maintaining the broth for a sufficient time and at a sufficient temperature until the resorcinol and formaldehyde polymerize to a consistency such that the carbon reinforcing agent does not settle in the broth;

pouring the broth to thickness of between 3 mm and 10 cm;

curing the broth for a sufficient time and at a sufficient temperature such that the broth sets into a solid; and firing the solid for a sufficient time and at a sufficient temperature such that the solid carbonizes into an electrically conductive plate.

10. The process of claim 9, wherein the carbon reinforcing agent comprises one from the group consisting of pitch based carbon fibers and cellulose fibers, and mixtures thereof, and the combining step comprises chopping the carbon fibers into an average length of less than 5 mm.

11. The process of claim 9, wherein the temperature of the broth is maintained at between 130–150° F. during polymerization.

12. The process of claim 9, comprising the step of maintaining the temperature of the broth below approximately 160° F.

13. The process of claim 9, wherein the broth is cured in air.

14. The process of claim 9, comprising providing a physical restraint before firing the solid, to thereby prevent deformation of the resulting plate.

15. The process of claim 9, wherein the solid is fired at a temperature between 965° C.–975° C.

16. The process of claim 9, comprising mechanically processing the plate after firing the solid, said mechanical processing including sanding or machining the plate to form an electrode.

17. A process for forming a carbon-reinforced electrode comprising:

introducing a carbon mat having a matrix structure into a container;

dissolving at least one from the group consisting of dihydroxy benzenes, dihydroxy naphthalenes, trihydroxy benzenes and trihydroxy naphthalenes and mixtures thereof, in formaldehyde to form a liquor;

introducing said liquor into said container such that said liquor is dispersed substantially throughout said matrix structure, thereby displacing air present in said matrix structure;

maintaining the matrix structure having liquor dispersed therein at a sufficient temperature and for a sufficient time such that said the liquor polymerizes into a block; and firing the block at a sufficient temperature and for a sufficient time such that the block carbonizes into an electrically conductive plate, wherein the carbon mat is sufficiently thick such that the block carbonizes into an electrically conductive plate having a thickness between 3 mm and 10 cm.

18. The process of claim 17, wherein the carbon mat is one from the group consisting of carbon felt, plain cellulose fiber, and cellulose fiber impregnated with activated carbon.

19. The process of claim 17, comprising providing a physical restraint before firing the block, to thereby prevent deformation of the resulting plate.

20. The process of claim 17, wherein the block is fired at a temperature between 965–975° C.

21. The process of claim 17, wherein the block is fired at a predetermined temperature until the resulting plate has a predetermined electrical property.

22. The process of claim 17, comprising mechanically processing the plate after firing the solid, said mechanical processing including sanding or machining the plate to form an electrode.

23. A process for forming a carbon-reinforced electrode comprising:

dissolving at least one from the group consisting of dihydroxy benzenes, dihydroxy naphthalenes, trihydroxy benzenes and trihydroxy naphthalenes and mixtures thereof, in formaldehyde to form a liquor;

combining the liquor with pitch based carbon fibers to form a broth;

adding a polymerization-promoting catalyst to the broth;

maintaining the broth at a temperature between 130–160° F. for a sufficient time until the resorcinol and formaldehyde polymerize to a consistency such that the carbon fibers do not settle in the broth;

pouring the broth into a mold to a thickness of between 3 mm and 10 cm;

curing the broth for a sufficient time and at a sufficient temperature such that the broth sets into a solid;

providing a physical restraint above an upper surface of the solid to thereby prevent deformation; and firing the solid to form an electrically conductive plate.

24. The process of claim 23, wherein the combining step comprises chopping the carbon fibers into an average length of less than 5 mm.

25. The process of claim 24, wherein the solid is fired at a temperature between 965–975° C.

26. The process of claim 24, wherein the solid is fired at a predetermined temperature and for a sufficient time until the solid carbonizes into an electrically conductive plate having a predetermined electrical property.

* * * * *